US012613186B2

(12) United States Patent
Peng et al.

(10) Patent No.: US 12,613,186 B2
(45) Date of Patent: Apr. 28, 2026

(54) REFRACTOMETER AND METHOD FOR MEASURING REFRACTIVE INDEX

(71) Applicant: SHENZHEN DIGITIZING FLUID TECHNOLOGY CO., LTD., Shenzhen (CN)

(72) Inventors: Ti Peng, Shenzhen (CN); Lingjie Xu, Shenzhen (CN); Yongzhi Wu, Shenzhen (CN)

(73) Assignee: SHENZHEN DIGITIZING FLUID TECHNOLOGY CO., LTD., Shenzhen (CN)

( * ) Notice: Subject to any disclaimer, the term of this patent is extended or adjusted under 35 U.S.C. 154(b) by 150 days.

(21) Appl. No.: 18/586,525

(22) Filed: Feb. 25, 2024

(65) Prior Publication Data

US 2024/0241046 A1 Jul. 18, 2024

Related U.S. Application Data

(63) Continuation of application No. PCT/CN2022/085257, filed on Apr. 6, 2022.

(30) Foreign Application Priority Data

Aug. 25, 2021 (WO) ................ PCT/CN2021/114432

(51) Int. Cl.
*G01N 21/41* (2006.01)
*G01N 21/43* (2006.01)

(52) U.S. Cl.
CPC ......... *G01N 21/4133* (2013.01); *G01N 21/43* (2013.01); *G01N 2201/0636* (2013.01);
(Continued)

(58) Field of Classification Search
CPC ............... G01N 21/4133; G01N 21/43; G01N 2201/0636; G01N 2201/0638; G01N 2201/12723; G01N 2021/435; G01N 21/01
See application file for complete search history.

(56) References Cited

U.S. PATENT DOCUMENTS 2,601,128 A * 6/1952 Rosenthal .............. G01N 21/43
356/137
3,279,309 A * 10/1966 Goldberg ............... G01N 21/43
356/135
(Continued)

FOREIGN PATENT DOCUMENTS

CN 102967583 A 3/2013
CN 104792732 A 7/2015
(Continued)

OTHER PUBLICATIONS

Japanese Notice of Reasons for Refusal, Japanese Patent Application No. 2024-536340, mailed Feb. 4, 2025 (10 pages).
(Continued)

*Primary Examiner* — Mohamed K Amara

(57) ABSTRACT

A refractometer and a method for measuring refractive index is disclosed. The refractometer comprises a light source, a reflecting module, a lens module, an array sensor, and a processor, wherein the reflecting module is configured to receive optical beams from the light source, the reflecting module comprises a detection surface configured to totally reflect at least part of the optical beams; the lens module is configured to converge optical beams from the detection surface onto a focal plane of the lens module; and the array sensor is located on the focal plane of the lens module.

20 Claims, 9 Drawing Sheets

(52) U.S. Cl.

CPC ............... *G01N 2201/0638* (2013.01); *G01N 2201/12723* (2013.01)

(56) References Cited

U.S. PATENT DOCUMENTS

| | | | | |
|---|---|---|---|---|
| 3,650,631 | A | 3/1972 | Grassel et al. | |
| 4,768,182 | A * | 8/1988 | Hatfield | G11B 7/005 |
| | | | | 356/497 |
| 4,834,104 | A | 5/1989 | Kreinick et al. | |
| 5,331,442 | A * | 7/1994 | Sorimachi | G06V 30/413 |
| | | | | 382/164 |
| 5,565,978 | A | 10/1996 | Okubo et al. | |
| 5,742,382 | A | 4/1998 | Kahre | |
| 6,094,262 | A * | 7/2000 | Almeida | G01N 21/4133 |
| | | | | 356/130 |
| 6,172,746 | B1 * | 1/2001 | Byrne | G01N 21/4133 |
| | | | | 356/135 |
| 9,194,798 | B2 | 11/2015 | Baba et al. | |
| 9,459,205 | B1 * | 10/2016 | Margalit | G01J 4/00 |
| 10,113,960 | B2 * | 10/2018 | Kamrat | G01N 21/43 |
| 11,079,327 | B2 * | 8/2021 | Pizzi | G01N 21/43 |
| 2007/0076192 | A1 * | 4/2007 | Nakamura | G01N 21/4133 |
| | | | | 356/131 |
| 2007/0229950 | A1 * | 10/2007 | Ouderkirk | G03B 21/60 |
| | | | | 359/454 |
| 2007/0242277 | A1 * | 10/2007 | Dolfi | G06F 3/03543 |
| | | | | 356/498 |
| 2010/0188660 | A1 * | 7/2010 | Palumbo | G01N 21/59 |
| | | | | 356/432 |
| 2010/0305872 | A1 * | 12/2010 | Abahri | G01N 21/4133 |
| | | | | 702/30 |
| 2013/0155395 | A1 * | 6/2013 | Muller | G01N 21/41 |
| | | | | 356/128 |
| 2013/0242115 | A1 | 9/2013 | Baba et al. | |
| 2014/0268115 | A1 * | 9/2014 | Voipio | G01N 21/4133 |
| | | | | 356/128 |
| 2015/0023054 | A1 * | 1/2015 | Goda | G02B 5/0247 |
| | | | | 359/584 |
| 2015/0062573 | A1 * | 3/2015 | Liu | A61B 5/444 |
| | | | | 356/300 |
| 2015/0260503 | A1 * | 9/2015 | Osawa | G01B 9/02083 |
| | | | | 356/479 |
| 2020/0056996 | A1 * | 2/2020 | Zarzar | G02B 26/007 |
| 2023/0185003 | A1 * | 6/2023 | Zarzar | B29D 11/0074 |
| | | | | 359/580 |

FOREIGN PATENT DOCUMENTS

| | | |
|---|---|---|
| CN | 106918575 A | 7/2017 |
| CN | 214622308 U | 11/2021 |
| CN | 215727691 U | 2/2022 |
| JP | 2000019110 A | 1/2000 |
| WO | 2020200691 A1 | 10/2020 |

OTHER PUBLICATIONS

International Search Report, International Application No. PCT/CN2021/114432, mailed May 27, 2022 (16 pages).

International Search Report, International Application No. PCT/CN2022/085257, mailed Jun. 29, 2022 (14 pages).

* cited by examiner

M1         M2     M3

M4         M5 the 600th pixel row in a detection image the average of the 600th row and its top 50 rows and its bottom 50 rows

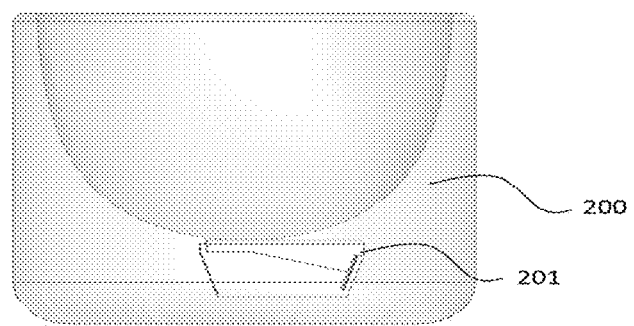

FIG. 19

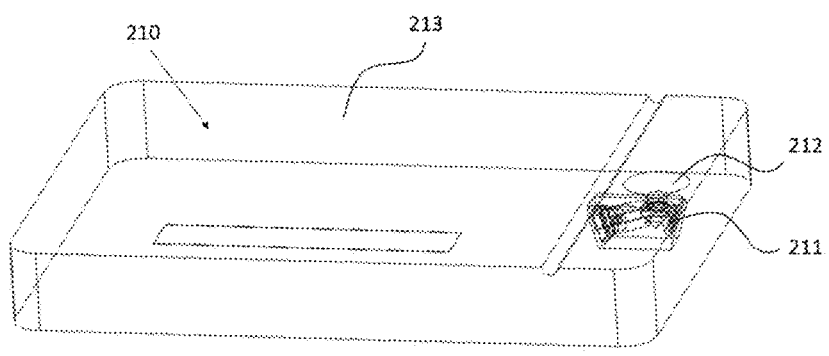

FIG. 20

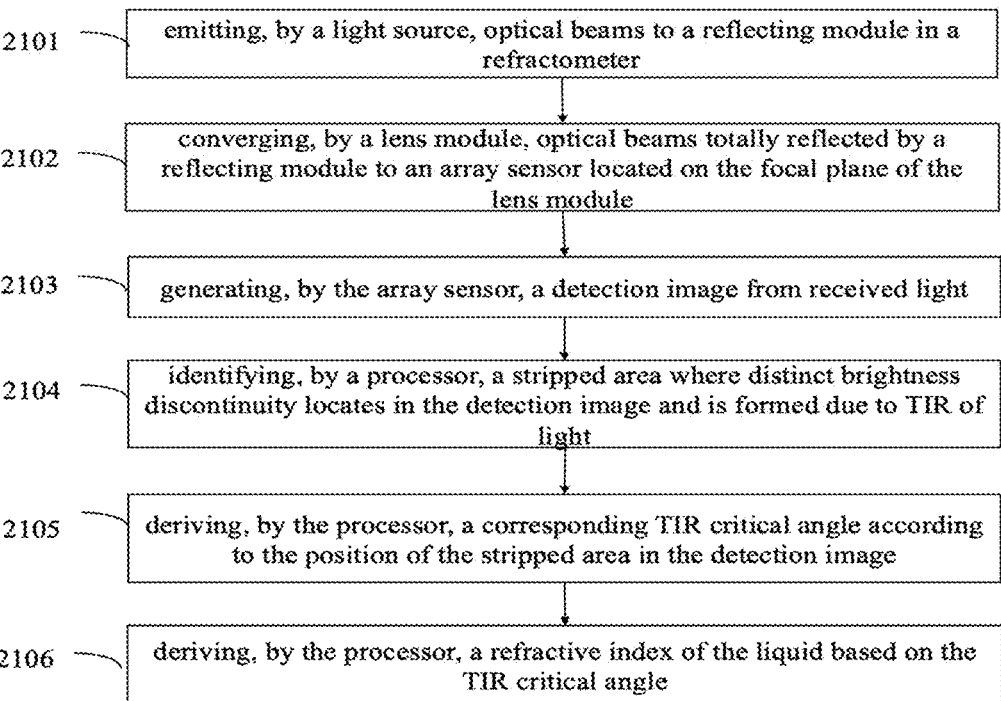

2101 — emitting, by a light source, optical beams to a reflecting module in a refractometer 2102 — converging, by a lens module, optical beams totally reflected by a reflecting module to an array sensor located on the focal plane of the lens module 2103 — generating, by the array sensor, a detection image from received light 2104 — identifying, by a processor, a stripped area where distinct brightness discontinuity locates in the detection image and is formed due to TIR of light 2105 — deriving, by the processor, a corresponding TIR critical angle according to the position of the stripped area in the detection image 2106 — deriving, by the processor, a refractive index of the liquid based on the TIR critical angle

FIG. 21

REFRACTOMETER AND METHOD FOR MEASURING REFRACTIVE INDEX

CROSS-REFERENCE TO RELATED APPLICATIONS

This application is a continuation of International Patent Application No. PCT/CN2022/085257 filed on Apr. 6, 2022, entitled "A Refractometer, Detecting Device and Method for Detecting Refractive Index", which claims the priority to and benefit of Patent Application No. PCT/CN2021/114432 filed on Aug. 25, 2021 and entitled "A Refractometer, Smart Cup and Method for Detecting Refractive Index", both of which are hereby incorporated by reference in their entireties.

TECHNICAL FIELD

This disclosure relates to the field of liquid refractive index measurement, and in particular relates to a refractometer and a method for detecting refractive index.

BACKGROUND

A refractometer is a device that measures the refractive index of liquids. As soluble solids will increase the refractive index of a liquid after dissolving in the liquid, measurement of total dissolved solids (TDS) can be achieved by measuring the refractive index of liquid. Therefore, a refractometer can be used to measure a liquid's TDS. Dissolved solids in liquids are usually sugar, so a refractometer is also used as a sugar meter to measure brix of beverages such as fruit juice, coffee, etc.

FIG. 1 is a structural schematic diagram of an existing refractometer. The refractometer comprises a slit 1', a light source 2' comprising a light emitting diode (LED), a linear senosr array 3', a triangular prism 4', and a processor which is not shown in FIG. 1. The refractometer utilizes the total internal reflection (TIR) rule that a TIR critical angle between two media depends on the refractive indices of the two media. When the prism 4' of the refractometer is covered by a liquid to be measured, if the refractive index of the liquid is lower than that of the prism 4', an optical beam incident on a surface 5' between the prism 4' and the liquid will be totally reflected if the incident angle satisfies that sin $\gamma$*n1=n2, where $\gamma$ specifies the incident angle, n1 specifies the refractive index of the prism 4' and n2 specifies the refractive index of the liquid. That is to say, for the light source 2' being a point light source, among the light incident on the surface 5', the part whose incident angle is greater than the TIR critical angel is totally reflected, and the part whose incident angle is not greater than the TIR critical angel is partially transmitted and partially reflected, causing a sudden decrease in brightness of reflection at the TIR critical angle. In image formed by the linear array sensor 3', pixels at different positions on the image correspond to optical beams incident on the surface 5' from the point light source with different incident angles. Therefore, a distinct brightness discontinuity can be detected at the l pixels arranged one-dimensionally corresponding to optical beams with incident angles of the TIR critical angle. The processor can derive the TIR critical angle through the distinct brightness discontinuity, and the refractive index of the liquid through the derived TIR critical angle.

However, the light source has a certain area of emitting surface due to process limit, thus optical beams incident on surface 5' from the light source 2' with different incident angles may be reflected to a same point on the photosensitive linear array 3', making it difficult to distinguish the incident angles of these optical beams and derive the TIR critical angle. Therefore, an existing refractometer is provided with a slit 1' located on the outgoing light path of the light source 2', making the light source a point source in the direction parallel to the photosensitive linear array 3', which helps defining the incident angles of optical beams on the photosensitive linear array 3'. The slit 1' is used to decouple emitting position and direction of the optical beams and to enable the refractometer only needs to detect the direction of the light without considering emitting positions. However, this design will result in a very large size of the photosensitive linear array 3', especially in a case where a wide measurement range of refractive index is required. The reasons are explained as follows.

As shown in FIG. 2, the size of the linear sensor array 3' is $2*\tan(\beta/2)*d$, where d specifies the optical path distance from the light source 2' to the photosensitive linear array 3', and $\beta$ specifies the divergence angle of outgoing light of the light source 2'. In a case where a large measurement range of refractive index is required, such as where measuring liquids with different refractive indices is needed, $\beta$ needs to have a larger value, so the size of the photosensitive linear array 3' also needs to be increased accordingly. But this is not conducive to miniaturization of the refractometer.

The linear sensor array 3' in an existing refractometer generally uses a linear CCD. For semiconductor chips such as CCD or CMOS, the larger the physical size, the higher the cost. Considering the limited semiconductor wafer size, the increase in device size will lead to a decrease in shipment rate and yield rate. Chips with larger size also has more difficulty of packaging and placement, and lower warping rate of placement, which will lead to an increase in cost. Usually, only a linear array can meet the cost requirements when a large semiconductor size is required. However, the linear array has high requirements for accuracy of installation position perpendicular to its own direction. That is because the linear CCD is easily affected by ambient light or stray light, and cannot be automatically corrected when a deviation of optical path happens, resulting deviations in measurement of the refractometer. The deviation may be caused by thermal expansion and contraction, impact or mechanical deformation.

SUMMARY

A first aspect relates to a refractometer comprising a light source configured to emit optical beams comprising a first optical beam and a second optical beam; a lens module configured to converge reflected optical beams from the reflecting module onto a focal plane of the lens module; an array sensor located on the focal plane and configured to detect received optical beam and generate a detection image, and a processor configured to identify a first stripped area where distinct brightness discontinuity caused by TIR of the first optical beam locates in the detection image for self-calibration; wherein a detection area is arranged on a surface of one of the media in the reflecting module and is configured to receive the second optical beam, and wherein in a case that the detection area is covered by liquid to be measured and that refractive index of the liquid is less than that of the media with the detection area on, at least part of the second optical beam is totally reflected by the liquid and is converged by the lens module to the array sensor, and the processor is to identify a second stripped area where distinct brightness discontinuity caused by TIR of the second optical beam locates in the detection image, and to derive the refractive index of the liquid based on the first stripped area and the second stripped area.

Optionally, in any of the preceding aspects, another implementation of the aspect provides that the detection area and the second medium are separately arranged on a same surface of the first medium, or the first medium, the second medium and the detection area are stacked, and the second optical beam passes through the first medium and the second medium before being incident on the liquid.

Optionally, in any of the preceding aspects, another implementation of the aspect provides that the reflecting module comprises a prism having a light incident surface, a light exit surface and a detection surface, a cured material layer and a transparent glass layer, the cured material layer and the transparent glass layer being sandwiched between the detection area and the detection surface, wherein the transparent glass layer is configured to seal the cured material layer and the prism, and the detection area locates at a side of the transparent glass layer facing away from the cured material layer, and wherein the first medium is the prism and the second medium is the cured material layer, or the first medium is the cured material layer and the second medium is the transparent glass layer.

Optionally, in any of the preceding aspects, another implementation of the aspect provides that refractive index of the prism is greater than that of the cured material layer, refractive index of the cured material layer is greater than that of the transparent glass layer, and a position of the array sensor avoids a position where totally reflected optical beam by the transparent glass layer is converged by the lens module, avoiding a third stripped area of distinct brightness discontinuity appearing on the detection image.

Optionally, in any of the preceding aspects, another implementation of the aspect provides that the cured material layer is cured UV glue.

Optionally, in any of the preceding aspects, another implementation of the aspect provides that the first medium comprises a prism having a light incident surface, a light exit surface and a detection surface, wherein the light incident surface is provided with an inlet allowing entrance of the first optical beam and the second optical beam, and wherein the light exit surface is provided with an outlet allowing exit of reflected first optical beam and reflected second optical beam, or is provided with a first outlet allowing exit of reflected first optical beam by the second medium and a second outlet allowing exit of reflected second optical beam by the liquid.

Optionally, in any of the preceding aspects, another implementation of the aspect provides that the detection image comprises a first edge and a second edge opposite to the first edge, the first edge corresponds to a higher refractive index than the second edge, wherein the first stripped area locates in the detection image between the first edge and a stripped area corresponding to the maximum refractive index of a measurement range of the refractometer.

Optionally, in any of the preceding aspects, another implementation of the aspect provides that the array sensor is configured to generate one or more detection images, wherein at least one detection image has pixels applied with different exposure parameters, or at least one detection image is applied with an exposure parameter different from that of another image, or wherein optical beams from the light source have different luminous intensities for at least two detection images respectively.

Optionally, in any of the preceding aspects, another implementation of the aspect provides that an aperture of a light-emitting surface of the light source and an aperture of the lens module are the same or have a difference less than $\frac{1}{5}$ of the aperture of the lens module, or an aperture of a light-emitting surface of the light source is greater than twice of an aperture of the lens module.

Optionally, in any of the preceding aspects, another implementation of the aspect provides that half width at half height of the optical beams from the light source is less than 5 nm, and an optical path of the optical beams is equipped with a narrowband filter, and half width at half height of optical beams filtered by the narrowband filter is less than 5 nm.

Optionally, in any of the preceding aspects, another implementation of the aspect provides that the processor is configured to identify the first stripped area and the second stripped area in the detection image at least when the processor determines that difference between brightness of the detection image and a preset brightness is less than a threshold.

Optionally, in any of the preceding aspects, another implementation of the aspect provides that the processor is configured to filter a target pixel row based on at least a portion of an upper pixel row and at least a portion of a lower pixel row of the target pixel row in the detection image before identifying the first stripped area and the second stripped area.

Optionally, in any of the preceding aspects, another implementation of the aspect provides that a filtered pixel in the target pixel row is determined based on a weighted average of at least a pixel in the target pixel row, a pixel in the upper pixel row and a pixel in the lower pixel row.

Optionally, in any of the preceding aspects, another implementation of the aspect provides that the processor is configured to identify pixels affected by stray light in the detection image, and exclude the identified affected pixels in deriving the refractive index of the liquid, and the pixels affected by stray light is identified by comparing brightness between multiple pixel rows and/or comparing brightness between multiple detection images.

Optionally, in any of the preceding aspects, another implementation of the aspect provides that the array sensor is configured to generate one or more initial detection images by detecting received optical beam, and the detection image is obtained based on weighted summation of multiple initial detection images.

Optionally, in any of the preceding aspects, another implementation of the aspect provides that the processor is configured to obtain blurriness of the first stripped area and the second stripped area respectively, and derive turbidity of the liquid based on the blurriness of the first stripped area and the second stripped area.

Optionally, in any of the preceding aspects, another implementation of the aspect provides that the refractometer further comprises a first temperature sensor and a second temperature sensor, wherein the first temperature sensor is in contact with the second medium to detect temperature of the second medium, and the second temperature sensor is set on the detection area to measure temperature of the liquid.

Optionally, in any of the preceding aspects, another implementation of the aspect provides that a relationship model among temperature of liquid, temperature of the second medium and refractive index of liquid is stored in the refractometer, and the processor is configured to derive the refractive index of the liquid further based on temperatures obtained by the first temperature sensor, the second temperature sensor, and the relationship model.

Optionally, in any of the preceding aspects, another implementation of the aspect provides that at least one of the following is adjusted to adjust the quality of the detection image: light intensity of the light source, exposure time of the array sensor, analog gain of the array sensor, or digital gain of the array sensor.

According to another aspect of the present disclosure, a method for measuring refractive index is provided, wherein the method comprises that emitting optical beams to a reflecting module in a refractometer, wherein the optical beams comprise a first optical beam and a second optical beam, and wherein the reflecting module comprises a first medium and a second medium adjacently arranged with refractive index of the first medium being greater than that of the second medium, and at least part of the first optical beam passing through the first medium is totally reflected by the second medium, and wherein the second medium has refractive index greater than 1.33 and not greater than 1.6 and having a variation no greater than 0.0003 with temperature change of per degree Celsius; supporting liquid to be measured by a detection area arranged on a surface of one of the media in the reflecting module, wherein the second optical beam is incident on the liquid and at least part of the second optical beam is totally reflected by the liquid when refractive index of the liquid is greater than that of the medium next to the liquid; converging, through a lens module, optical beams reflected by the reflecting module to an array sensor located on the focal plane of the lens module; generating, by the array sensor, a detection image from received light on the focal plane, wherein a first stripped area where distinct brightness discontinuity locates in the detection image is formed due to TIR of the first optical beam for self-calibration, and a second stripped area where distinct brightness discontinuity locates in the detection image is formed due to TIR of the second optical beam; identifying, by the processor, locations of the first stripped area and the second stripped area in the detection image; and deriving, by the processor, refractive index of the liquid based on the locations of the first stripped area and the second stripped area.

BRIEF DESCRIPTION OF THE DRAWINGS

For a more complete understanding of this disclosure, and the advantages thereof, reference is now made to the following brief description taken in connection with the accompanying drawings, in which:

FIG. 19 is a schematic structural diagram of a smart cup, FIG. 20 is a structural schematic diagram of a smart scale, FIG. 21 is a schematic diagram of an embodiment of a method for detecting refractive index of liquid by using a refractometer in the present disclosure.

DETAILED DESCRIPTION

Figure 1:
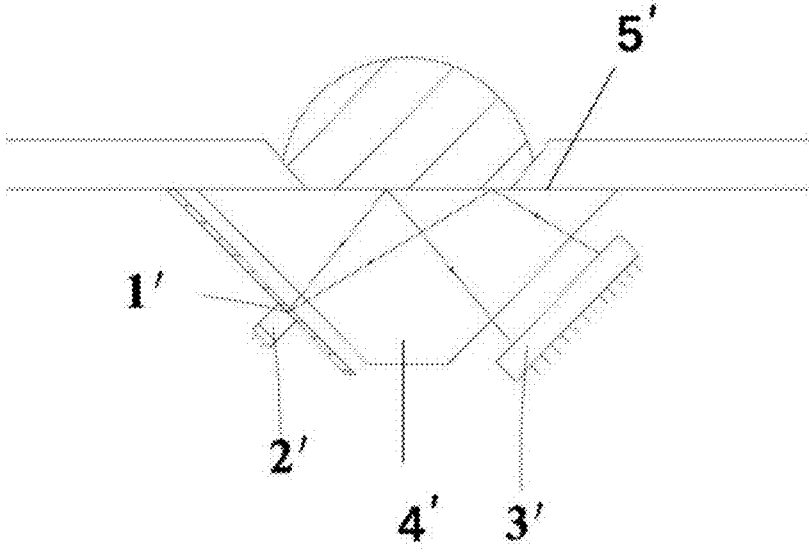
FIG. 1 is a structural schematic diagram of an existing refractometer.
Figure 2:
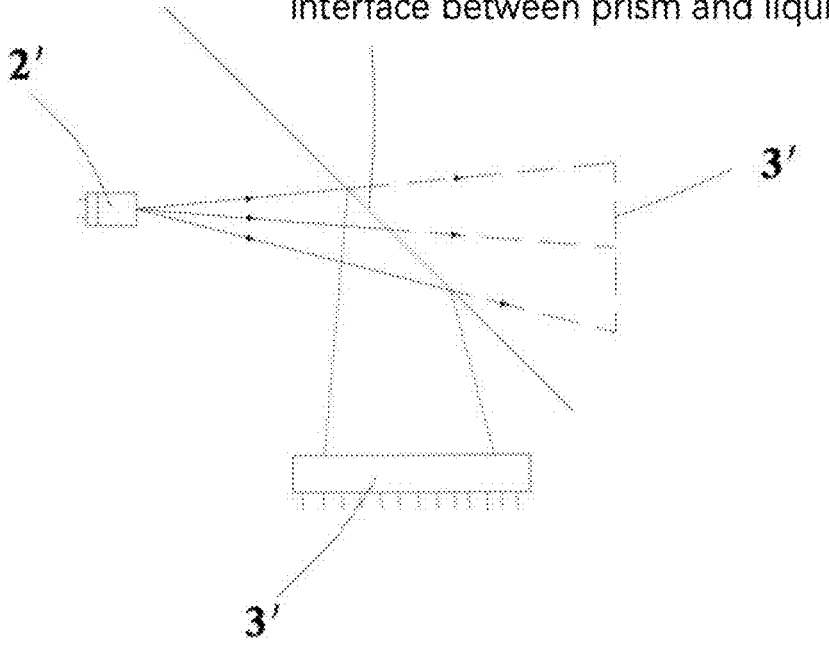
FIG. 2 is an equivalent schematic diagram of the existing refractometer.

The embodiments of this disclosure are discussed in detail below. It should be appreciated, however, that the present disclosure provides many applicable inventive concepts that can be embodied in a wide variety of specific contexts. The specific embodiments disclosed are merely illustrative of specific ways to make and use the invention, and do not limit the scope of the invention.

An exemplary structure of the refractometer is provided. In this example, compared to the prior art where a slit is set next to a light source to decouple the direction and emitting position of an optical beam from the light source incident on a linear array sensor in a direction parallel to the linear array sensor, a lens module is located next to a two-dimensional array sensor to decouple the angle and emitting position of optical beams incident on the array sensor. Moreover, as the decoupling by the lens module is in two dimensions, the array sensor can be a two-dimensional area for detecting optical beams, providing self-calibration for refractive index measurement. Measurement of refractive index of a liquid can share a light source and an array sensor, avoiding calculation bias caused by offset between two sets of optical paths, each of which comprises a light source and an array sensor. The offset between the two sets of optical paths can be caused by poor consistency of semiconductor chips or installation structure, installation deviation, mechanical impact or temperature drift, etc.

In addition, by adding a lens module in front of the array sensor and utilizing infinity focusing to decouple emitting position and direction of an optical beam, light from a light source without a small light emitting surface reflected with same exit angle by a reflecting module can be converged to a same location of the array sensor by the lens module. In the prior art, a light source with a large divergence angle and a small light emitting surface is required, but normally LED light source has a relatively small divergence angle. Therefore, it is necessary to find a specially-made LED light source with a large divergence angle and a small exit surface for a refractometer in the prior art. Compared with the prior art, as the light source in this disclosure does not have to bear the function of distinguishing direction and emitting positions of optical beams, there are less restrictions on selection of the light source.

Moreover, compared with the prior art where a linear array sensor is needed for detection due to the slit next to the light source, in this example, an array sensor which is two-dimensional is used to detect optical beams, which can obtain more information than the linear array sensor. This is beneficial to improve the accuracy of the refractive index measured and helps to obtain more information about the liquid to be measured. In one example, the refractometer uses CMOS sensor as the array sensor, which has lower cost, higher accuracy and lower installation requirements, and can achieve more than the linear array sensor. For example, compared with a linear array sensor, CMOS sensor can improve accuracy and anti-interference ability of the refractometer, and can achieve more measurement functions. Moreover, compared with the refractometer of the prior art which must have consistent reflection properties over the surface covered by liquid where TIR occurs, since the light direction can be directly measured in the present disclosure, even if there are bubbles on a surface where TIR occurs or the surface is not completely covered by liquid to be measured, there is still distinct brightness discontinuity on the detection image.

Since refractive index of liquid will drift with change of temperature, there will be a deviation on measurement of refractive index of liquid based on the solid soluble content in the liquid. In order to ensure the measurement accuracy of the refractometer, an existing solution is to calibrate the position where the distinct brightness discontinuity locates in a detection image formed by a linear array sensor of the refractometer when measuring a liquid with a specific concentration, such as a liquid with 0 Brix. Specifically, the position where the distinct brightness discontinuity locates for a liquid with 0 Brix is preset in the refractometer. The refractometer measures clear water in real time, forming a position with distinct brightness discontinuity on the image formed by the linear array sensor as a self-calibration position. When the refractometer measures refractive index of liquid based on content of solid soluble substances, it corrects the measurement of the liquid based on the preset position and the self-calibration position. But this requires self-calibration with clean water before measurement of the liquid.

The refractometer in this example has a second medium fixed on a reflecting module for self-calibration instead of using clear water for self-calibration in the prior art. Optical beams can be totally reflected by the second medium to an array sensor, causing distinct brightness discontinuity in the image formed by the array sensor. Thus, the distinct brightness discontinuity can be detected to measure the refractive index of the second medium, and the refractive index of the second medium measured can be used to correct the refractive index measurement of liquid. Compared with the prior art, since the combination of the lens module and the array sensor is used to decouple the emitting position and direction of optical beams, and the array sensor is two-dimensional, a same array sensor can be used for measurement of both the second medium and liquid, and a same light source can be used to form two different positions of distinct brightness discontinuity corresponding to the second medium and liquid respectively on a detection image formed by the array sensor. This can avoid measurement error caused by difference between different linear array sensors and light paths if different linear array sensors and light paths are used to measure refractive index of clear water and liquid to be measured respectively, and improve accuracy of the refractometer. Moreover, due to the second medium to calibrate refractive index of liquid to be measured, compared with the refractometer in the prior art, the refractometer in this example can eliminate the process of calibration using clear water before measurement of liquid, and measure liquids of high temperature more accurately, thus can be used in more application scenarios.

Figure 3:
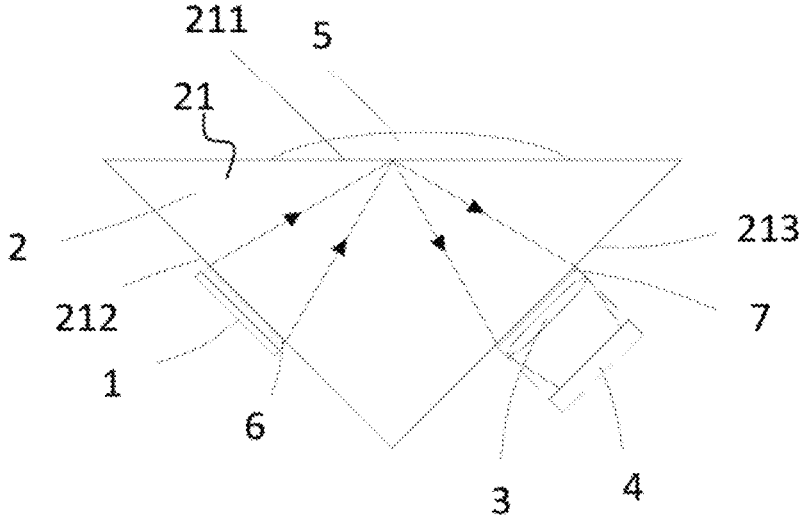
FIG. 3 is a schematic cross-sectional view of a structure of a refractometer.

FIG. 3 is a schematic cross-sectional view of a structure of a refractometer in the disclosure. As shown in FIG. 3, the refractometer comprises a light source 1, a reflecting module 2, a lens module 3, an array sensor 4, a control module and a processor. The control module and the processor are not shown in FIG. 3. The control module is used for controlling the light source 1 to emit optical beams and controlling the array sensor 4 to perform light detection. Optionally, the control module includes a light source controller and a sensor controller for controlling the light source 1 and the array sensor 4 respectively. The reflecting module 2 is configured to receive optical beams from the light source 1. When TIR rule is satisfied, light from the light source 1 with an incident angle greater than or equal to the TIR critical angle undergoes TIR, and light with an incident angle smaller than the TIR critical angle undergoes partial transmission and partial reflection. Reflected light exit the reflecting module 2 and then enter the lens module 3. The lens module 3 is configured to converge light from the reflecting module 2 to the array sensor 4 located on the focal plane of the lens module 3. The control module is also configured to control the array sensor 4 to detect the received optical beams and generate a detection image.

The lens module 3 may comprise a lens, and the focal plane of the lens module 3 is the focal plane of the lens. Alternatively, the lens module 3 comprises a lens group consisting of at least two lenses, one of which can be used to reduce imaging aberration and distortion through optical design. In a case that the lens module 3 comprises at least two lenses, the focal plane of the lens module 3 is an equivalent focal plane of the at least two lenses.

Figure 4:
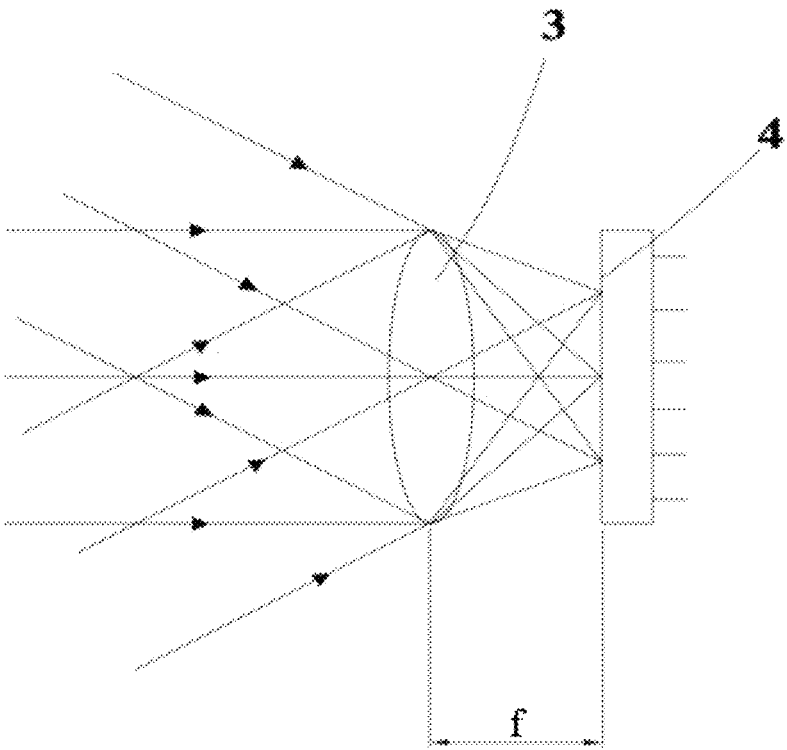
FIG. 4 is a principle schematic diagram of the imaging of a lens unit with infinity focusing.

The function of the lens module will be explained below by taking one lens as an example with reference to FIG. 4. As shown in FIG. 4, ideally parallel light can be converged by the lens 3 to one converging point on its focal plane. The converging point is the intersection point between the lens optical center and the focal plane that extends in the direction of the parallel light. In that case, the convergence point is only related to the direction of the light, not the emitting position. Utilizing this principle, emitting position and direction of light can be decoupled by setting a lens module in front of the array sensor, so that in any plane passing through the optical center of the lens module, all light along the plane totally reflected by different position of the reflecting module at a same exit angle will be converged to a same position of the array sensor 4. Thus, distinct brightness discontinuity in a stripped area is formed on a detection image produced by the array sensor 4. Due to the lens module, distinct brightness discontinuity located in different areas in the detection image correspond to light that are totally reflected at different TIR critical angles, so the processor can determine a TIR critical angle by identifying a corresponding stripped area where distinct brightness discontinuity locates, and then calculate the corresponding refractive index according to the TIR critical angle.

In one example, the light source 1 comprises a LED light bar, or comprises a light source obtained by patching or packaging a plurality of LED light beads. The wavelength of the LED is compatible with the wavelength response of the array sensor. The wavelength can be between 300 nm and 1000 nm. For example, the wavelength can be between 400 nm and 500 nm, or between 500 nm and 600 nm, or between 600 nm and 700 nm, or between 700 nm and 800 nm, or between 800 nm and 900 nm. Optionally, the LED light source emits green light. For example, the central wavelength of light emitted is between 500 nm and 600 nm. Since a common array sensor on the market is a CMOS sensor with a Bayer pattern of RGGB, this type of array sensor has a higher resolution and is more sensitive to the G channel. Using a light source with green light emitted can better cooperate with the array sensor.

In one example, as shown in FIG. 3, an optical filter 7 matching wavelength of the light source 1 is provided on the optical path between a receiving interface of the reflecting module 2 and the array sensor 4 for transmitting light from the light source 1 and reflecting light of other wavelength to reduce the interference of background light on detection. Optionally, light emitted by the light source 1 is of a single wavelength, so that a narrow-band filter can be set to filter more background light.

In one example, the reflecting module 2 comprises a first medium 21. The refractometer also comprises a detection area arranged on the surface of the first medium, used for supporting the liquid 5 to be measured. When the detection area is covered with liquid and refractive index of the liquid is lower than that of the first medium, at least part of light is totally reflected by the liquid. The processor is configured to calculate the refractive index of the liquid according to a stripped area where distinct brightness discontinuity caused by TIR of the light locates in the detection image.

In one example, the first medium can be a prism, and the prism 21 comprises a light incident interface 212, a detection interface 211 and a light exit interface 213. Optical beams from the light source 1 enters into the prism 21 from the light incident interface 212, and is incident on the detection interface 211. When the incident angle of an optical beam on the detection interface 211 satisfies the TIR rule, the optical beam is totally reflected on the detection interface 211 inside the prism 21, and exits from the light exit interface 213. Optionally, the prism 21 is a triangular prism. Optionally, the prism 21 is an isosceles prism, such as an isosceles rectangular prism, so that the structure of the prism is more compact, making the overall structure smaller.

Optionally, anti-reflection coatings are provided on the light incident interface 212 and the light exit interface 213 of the prism 21 to increase the transmittance of optical beams. The prism 21 can be made of glass material or other transparent materials such as plastic and resin. Optionally, the size of the detection interface 211 matches the divergence angle of the outgoing light of the light source 1, so that the light spot formed by the outgoing light on the detection interface 211 matches the detection interface 211 or is slightly smaller than detection interface 211, which is beneficial to the miniaturization of the refractometer. In other examples, the reflecting module may comprise other optical elements with a high refractive index.

The field of view of a lens is determined by a focal length represented by f and an aperture size represented by d of the lens. However, to achieve a wide refractive index detection range for a refractometer, it not only depends on the viewing angle of the lens, but also needs to ensure that the light within the field of viewing angle can be reflected by the detection interface 211 and incident into the lens. Therefore, it is necessary to increase a size of an exit surface of the light source accordingly. The actual viewing angle of the lens is determined by the size of the exit surface of the light source and the size of the lens. A detailed explanation is provided below with the equivalent optical system shown in FIG. 5. In this equivalent optical system, the lens module 3, the array sensor 4 and the processor are mirrored on the side of the reflecting module facing away from the light source 1, and the lens module 3 takes a lens as an example.

Figure 5:
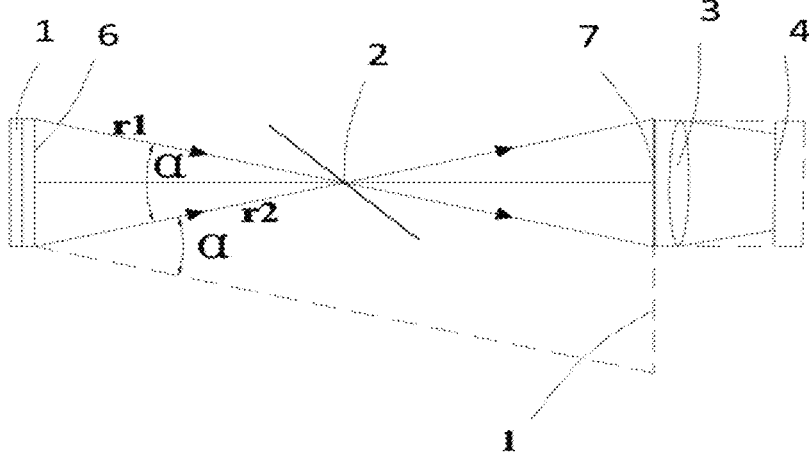
FIG. 5 is a schematic diagram of an equivalent optical system of a refractometer.

As shown in FIG. 5, an angle range represented by α that can be detected by the array sensor 4 is defined by two optical beams on the edge. One of the two optical beams is represented by r1, extending from the uppermost end of a light-emitting surface of the light source 1 to the lowermost end of an effective aperture of the lens 3. The other one is represented by r2, extending from the lowermost end of the light-emitting surface of the light source 1 to the uppermost end of the effective aperture of the lens. The angle range of α is determined by a size of the light emitting surface of the light source 1, the effective aperture of the lens 3, and the distance between the light emitting surface of the light source 1 and the lens 3. Therefore, to achieve a same angle range of α, compared with the refractometer with a slit shown in FIG. 1, the size of the array sensor 4 can be shared between the size of the light emitting surface of the light source 1 and the effective aperture of the lens 3. That is to say, for a same angle range of α, the length of the linear array sensor in the refractometer shown in FIG. 1 is equal to the sum of the aperture of the light emitting surface of the light source 1 of a refractometer provided in this disclosure and the effective aperture of the lens of the refractometer. Therefore, compared with the prior art, a refractometer in this disclosure can have a smaller light source and array sensor under the same requirements of detection angle range, which helps product miniaturization and reducing costs. Moreover, size of the light source can be increased to reduce size of the array sensor. Such refractometer has the advantages of low cost and small volume.

Figure 6:
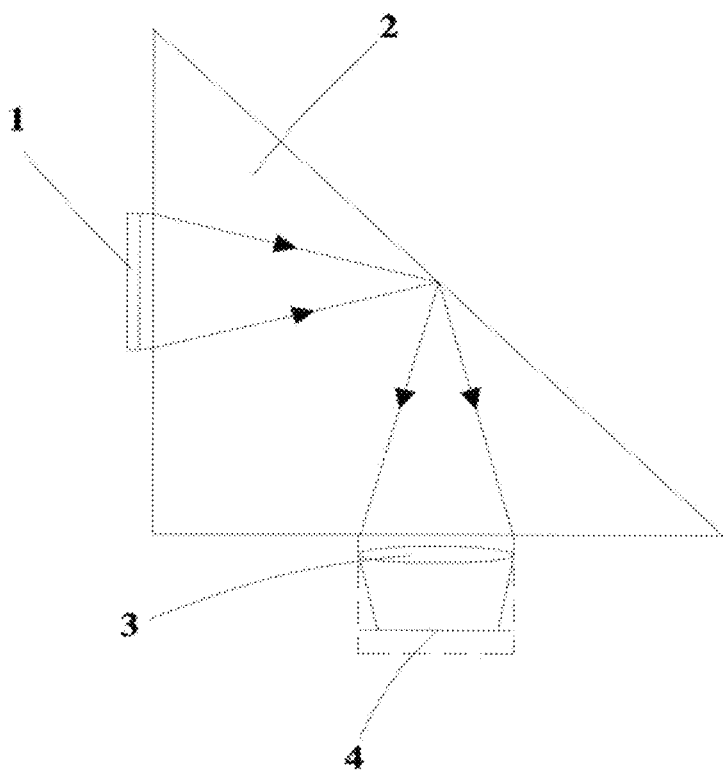
FIG. 6 and FIG. 7 are schematic diagrams of the refractometer with light source modules and lens modules of different sizes.

In some examples, aperture of the light emitting surface of the light source 1 is greater than or equal to an effective aperture of the lens module 3. For example, as shown in FIG. 6, an aperture of the light-emitting surface of the light source 1 and an effective aperture of the lens module 3 are the same, or have a difference less than ⅕ of the aperture of the light-emitting surface. Therefore, for a same angle range of α, the aperture of the array sensor in the refractometer of the present disclosure is around half of the length of the linear array sensor of the refractometer in the prior art, which can reduce the cost and difficulty in mass production.

Figure 7:
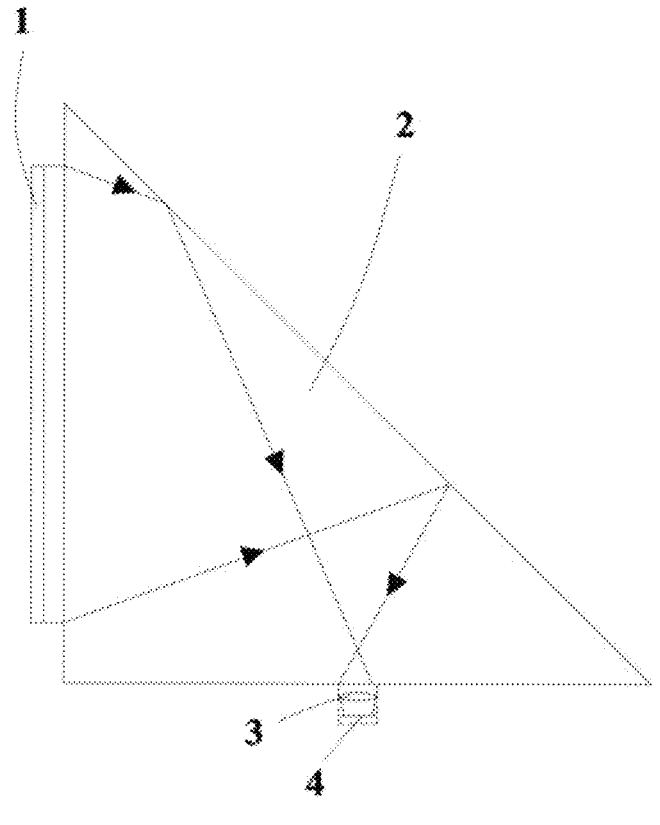

In another example, as shown in FIG. 7, an aperture of the light emitting surface of the light source 1 is larger than twice an effective aperture of the lens module 3. In this way, for a same angle range of α, the aperture of the array sensor in the refractometer of the present disclosure can be very small. Due to the fact that increasing the size of light source 1 requires much lower cost and production difficulty compared to increasing the size of the array sensor, light source 1 with larger size can greatly reduce cost and production difficulty while keeping the angle range of α the same.

Optionally, the angle range of α covers a TIR angle range of the lens module 3 to ensure a large refractive index detection range of the refractometer, wherein the TIR angle range refers to all angles at which TIR can occur inside the reflecting module. Optionally, the reflecting module comprises a medium with a high refractive index to reduce the TIR angle range of the reflecting module. However, dispersion of glass with high refractive index could lower detection accuracy of the TIR critical angle. This is because optical beams of different wavelengths have big difference in the refractive index when being incident on the glass with high refractive index, which in turn will cause the array sensor to produce a detection image with a blur brightness mutation boundary and reduce the detection accuracy of the TIR critical angle. In one example, a light source with a narrow wavelength bandwidth may be used the refractometer, or a narrow-band filter is set on the outgoing light path of the light source to reduce the wavelength bandwidth of the light source to reduce dispersion. For example, outgoing light of the light source or outgoing light filtered by the narrow-band filter is light with a full width at half maximum of 5 nm or less.

Figure 8:
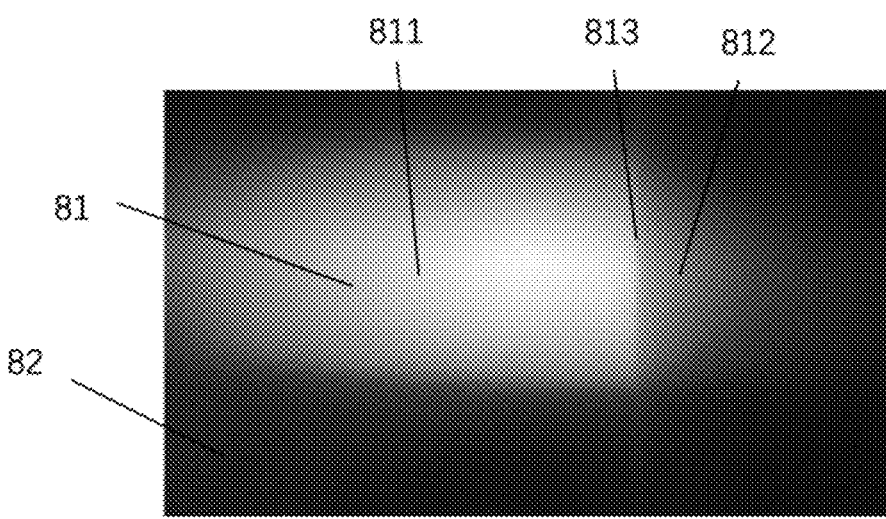
FIG. 8 shows an example of a detection image generated by the array sensor.

When liquid to be measured covers the detection area, the array sensor generates one or more detection images. FIG. 8 shows an example of a detection image generated by the array sensor. As shown in FIG. 8, the detection image 8 comprises a reflection area 81 and a non-reflection area 82 surrounding the reflection area 81. The reflection area 81 comprises a TIR area 811 and a non-TIR area 812 corresponding to non-TIR light reflected by the liquid. The TIR area 811 corresponds to the area on the array sensor where TIR light reflected by the liquid is incident, and the non-TIR area 812 corresponds to the area on the array sensor where non-TIR light reflected by the liquid is incident. Since the intensity of the non-TIR light suddenly decrease compared with the TIR light, a stripped area 813 where distinct brightness discontinuity caused by the TIR light is formed between the TIR area 811 and the non-TIR area 812, and the stripped area 813 corresponds to light with incident angle on the detection area 211 being the TIR critical angle.

Due to the arrangement of the lens module, different positions of the stripped area in the detection image correspond to light totally reflected by liquid to be measured with different TIR critical angles. Therefore, the processor can determine the position of the stripped area and calculate refractive index of the liquid according to the TIR critical angle corresponding to the position of the stripped area.

In the present disclosure, since a lens module is added in front of the array sensor to decouple direction and emitting position of optical beams, light from the light source can be converged on the array sensor by the lens module without a light source with small light emitting surface. Compared with the refractometer in the prior art, the light source in the present disclosure does not need to bear the function of decoupling direction and emitting position of light. In the prior art, light source with larger divergence angle is required. But normally LED light source has a relatively small divergence angle. Therefore, it is necessary to find a specially-made LED light source with a large divergence angle and a small exit surface for a refractometer in the prior art. In the present disclosure, there are less restrictions on selection of the light source., light source with larger divergence angle can be realized by multiple LEDs and light diffusing sheets. In one example, as shown in FIG. 3, the light source 1 further comprises a light diffusing sheet 6 located on one side of the light emitting surface. Since the array sensor detects light from different directions, the light diffusing sheet can improve the uniformity of light received by the array sensor, thereby improving the uniformity of the detection image, and avoiding low measurement accuracy caused by inconsistent light intensities at different directions.

In some examples, the reflecting module includes two adjacent media, which may be media other than the first medium, or may include the first medium. TIR of light from the light source occurs between the two adjacent media, and then another stripped area where distinct brightness discontinuity caused by TIR of the light is formed on the detection image for calibrating refractive index of the liquid to be measured. The stripped area for calibration can reduce the calculation deviation of refractive index of liquid to be measured, which is caused by drift of refractive index of the liquid with change of temperature, and improve the accuracy of the refractometer. An exemplary structure of a refractometer is described below with reference to FIG. 9.

Figure 9:
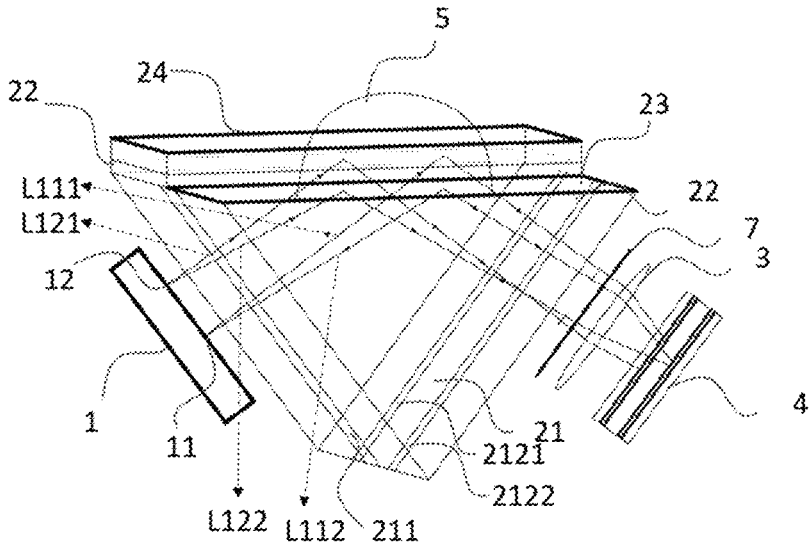
FIG. 9 is a schematic diagram of an exemplary refractometer.

FIG. 9 is a schematic diagram of an exemplary refractometer. As shown in FIG. 9, the light source 1 is configured to exit a first optical beam and a second optical beam. The reflecting module comprises at least two media for receiving optical beams from the light source. In one example, the reflecting module comprises a first medium 21 and a second medium 22 which are adjacently disposed. A refractive index of the first medium 21 is greater than a refractive index of the second medium 22, and a first TIR area exists between the first medium 21 and the second medium 22. The reflecting module further comprises a detection area 23 disposed above the first medium 21. Optionally, the second medium 22 and the detection area 23 are disposed in different areas on the same surface of the first medium 21.

The first medium is configured to receive the first optical beam and the second optical beam. At least part of the first optical beam is incident on the second medium 22 from the first medium 21. Since the refractive index of the first medium 21 is greater than that of the second medium 22, when incident angles of the first optical beam upon the second medium 22 comprises the TIR critical angle, at least part of the first optical beam incident on the second medium 22 is totally reflected by the second medium 22 in the first TIR area. When the detection area 23 is covered by the liquid 5, at least part of the second optical beam is incident on the liquid. As refractive index of the liquid is less than that the medium next to the liquid, when incident angle of the second optical beam incident on the liquid comprises the TIR critical angle, at least part of the second optical beam incident satisfying the TIR rule is totally reflected by the liquid.

The light source module 1 may contain one or more light emitting units, such as LED. In a case where the light source 1 contains a plurality of light emitting units, the first optical beam and the second optical beam may be from different light emitting units, or, as is illustrated in FIG. 9, may be optical beams with different exit angles respectively from all the emitting units in the light source 1. In FIG. 9, an optical beam L111 emitted by the emitting unit 11 and an optical beam L121 emitted by the emitting unit 12 belong to the first optical beam and are incident on the second medium 21 for TIR. The optical beam L112 emitted by the emitting unit 11 and the optical beam L122 emitted by the emitting unit 12 belong to the second optical beam and are incident on the liquid for TIR.

Optionally, divergence angle of the first optical beam is such that all or at least 50% or more of the first optical beam has incident angle on the second medium 22 greater than or equal to the TIR critical angle and is totally reflected on the first TIR area, improving the brightness contrast between both sides of the brightness discontinuity on the detection image. Optionally, the area of the second medium 22 matches the divergence angle of the first optical beam, so that the light spot formed by the first optical beam on the second medium 22 just covers the second medium 22 or is slightly smaller than the second medium 22, facilitating the miniaturization of the refractometer.

In the example shown in FIG. 9, the first medium 21 is a triangular prism. The second medium 22 is a coating laid on one surface of the first medium 21. The surface is divided into a first area and a second area which are side by side. The second medium 22 is fixed on the side of the first area facing away from the light source, and the second medium 22 is not covered on the second area and is the detection area. When the refractometer measures a liquid, the liquid covers the second area. Optionally, a groove is provided on the surface of the first medium 21 to support the liquid, the second medium is provided on a part of the groove by spraying process or printing process or other processes, and the remaining area of the groove is set as the detection area 23. In some examples, the second medium also needs to be waterproofed. For example, after the first area of the groove is coated, a light-transmitting waterproof material 24, such as a glass sheet, is added to cover only the first area, or to cover the entire groove.

In some examples, the second medium may be a material whose refractive index varies with temperature in a way having a strong correlation with the way in which refractive index of clear water varies with temperature. This can improve the accuracy of self-calibration using the second medium. Optionally, change of refractive index of the second medium with temperature change of per degree Celsius is no greater than 0.0003.

Figure 10A:
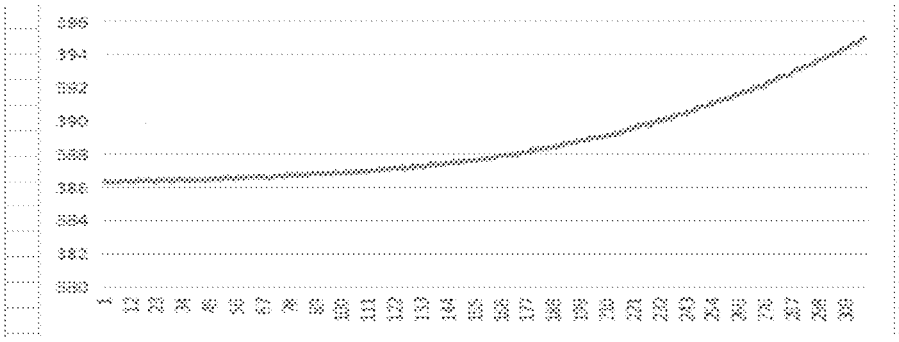
FIG. 10a is a schematic diagram of experimental results of drift of refractive index of the UV glue with increase of temperature.
Figure 10B:
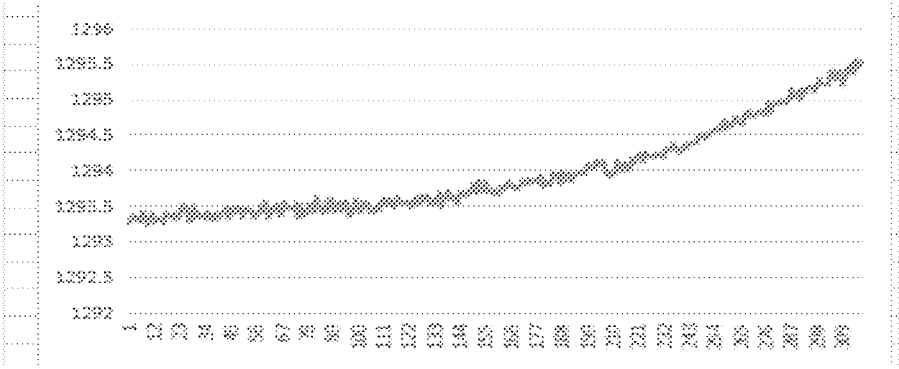
FIG. 10b is a schematic diagram of experimental results of drift of the refractive index of clear water with increase of temperature.
Figure 10C:
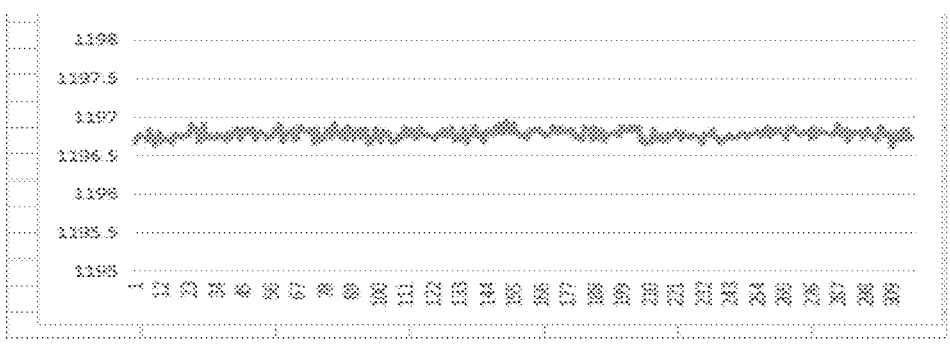
FIG. 10c shows distribution of the refractive index difference at each temperature.

The second medium can be liquid, such as clear water sealed and fixed in the liquid groove on the surface of the triangular prism. Or the second medium can be a solid, such as a photocurable coating, a coating cured in high temperature, or a naturally cured coating. The coating cured in high temperature can be Poly tetrafluoroethylene that have been cured in high temperature. The naturally cured coating can be a naturally cured fluorocarbon resin FEVE coating. The coating can be a UV glue, such as a UV glue that have been photocured. The way of refractive index of the UV glue varying with temperature and the way of refractive index of clear water varying with temperature are highly correlated. Using the measurement of refractive index of the UV glue for calibration can improve the accuracy of the measured refractive index of the liquid. FIGS. 10*a-c* are schematic diagrams of experimental results of variation of refractive index of a UV glue and clear water with change of temperature. Among them, FIG. 10*a* is a schematic diagram of experimental results of drift of refractive index of the UV glue with increase of temperature, FIG. 10*b* is a schematic diagram of experimental results of drift of the refractive index of clear water with increase of temperature, and FIG. 10*c* shows distribution of the refractive index difference at each temperature. The ordinate in FIG. 10*a-c* represents a position of stripped area where distinct brightness discontinuity locates in the detection image, and the abscissa represents a time of measurement. Different positions correspond to different refractive indices, and different times of measurement correspond to different temperatures. It can be seen from the figure that there is a strong correlation between the way of refractive index of UV glue and clear water varying with temperature respectively. Moreover, the UV glue has advantages of high transmittance and low expansion rate. Optionally, the UV glue that has been cured is a glue with refractive index greater than 1.33 and not greater than 1.6.

There may be various positional relationships between the first area and the second area of the first medium. In the embodiment shown in FIG. 9, light emitted by the light source has the largest divergence angle in the section parallel to the paper surface, and has the smallest divergence angle in the section perpendicular to the paper surface. Matching with the optical beam emitted by the light source 1, the first area and the second area are arranged along the width direction of the two areas which is perpendicular to the paper surface, and the second area can cover the divergence angle of the light emitted from the light source 1 in the length direction of the two areas which is parallel to the paper surface. In this way, the detection range of TIR critical angles that can be measured in the second area can be realized to be larger, thereby increasing refractive index measurement range, and minimizing overlapping area of a first imaging area in the detection image of the array sensor 4 corresponding to the second optical beam and a second imaging area in the detection image corresponding to first optical beam, which reduces the mutual interference between the first imaging area and the second imaging area. In some examples, the first area and the second area can have other positional relationships. For example, the first area can cover the TIR critical angle corresponding to the second medium, and the second area can preferably cover the area where the first optical beam with as larger incidence angle range as possible, which helps to achieve a larger measurement range of refractive index.

TIR of the first optical beam in the first TIR area will cause a first stripped area where distinct brightness discontinuity locates in the detection image to be fixed in each detection image. TIR by the liquid to be measured will cause a second stripped area where distinct brightness discontinuity locates in the detection image. Specifically, a detection image of the array sensor comprises a first imaging area corresponding to the incidence of the first optical beam and a second imaging area corresponding to the incidence of the second optical beam. The first imaging area comprises areas located on both sides of the stripped area. One side of the first stripped area has a higher brightness, which is incident area of the first optical beam of TIR. For the convenience of description, the one side is hereinafter referred to as a TIR area. The other side has a lower brightness, which is incident area of the first optical beam of non TIR. For the convenience of description, hereinafter referred to as the non-TIR area. Similarly, the second imaging area comprises a TIR area and a non-TIR area located on both sides of the second stripped area.

Figure 11:
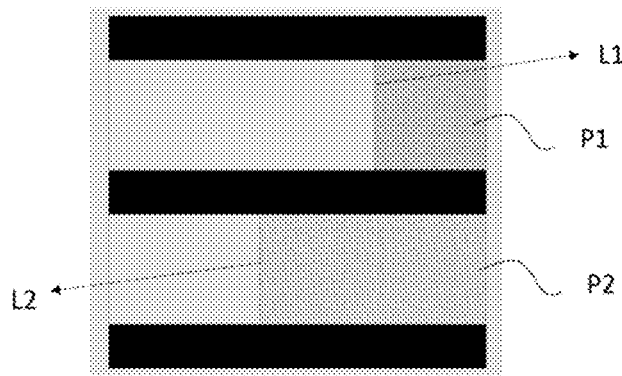
FIG. 11 shows an exemplary relationship between the first stripped area and the second stripped area.
Figure 12:
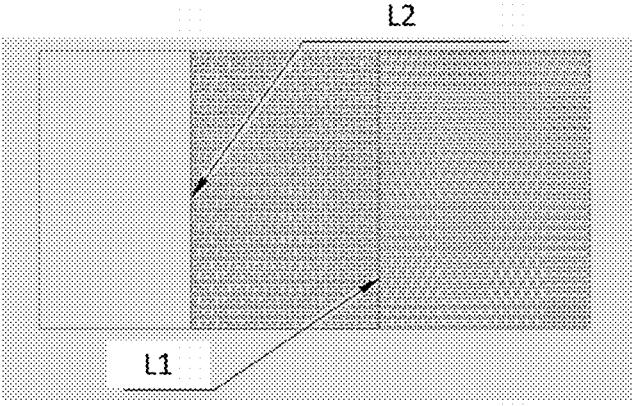
FIG. 12 shows another exemplary relationship between the first stripped area and the second stripped area.

As shown in FIG. 11, the first imaging area P1 and the second imaging area P2 can be two areas separated from each other in the detection image without intersection, which can increase the gap between the first stripped area L1 and the second stripped area L2 and reduce mutual interference of each other, making it easier for the processor to detect the two stripped areas. Or, as shown in FIG. 12, the first imaging area P1 and the second imaging area P2 can be overlapping or even coinciding. In this case, as long as refractive index of the liquid to be measured is different from that of the second medium, positions of the two stripped areas are different, and the processor can identify the first stripped area and the second stripped area respectively through detection of vary of brightness. Optionally, the first stripped area is located near an edge of the detection image. Optionally, the detection image includes a first edge and a second edge opposite to each other, and the first edge corresponds to a higher refractive index than the second edge. Optionally, the first stripped area is located in the detection image between the first edge and a position corresponding to the maximum refractive index within the refractometer's refractometer measurement range, which can ensure that the refractometer has a largest measurement range with a same FOV of the array sensor. Optionally, distance between the first stripped area and the first edge is greater than ⅒ of the width of the detection image, and distance between the first stripped area and the position corresponding to the maximum refractive index within the refractometer's refractometer measurement range is greater than ⅛ of the width. This can ensure measurement accuracy of the first stripped area and the second stripped area.

There are many ways to separate the first imaging area and the second imaging area. In some examples, optical paths of the second optical beam and the first optical beam can be separated by setting a structure on the optical path in front of the lens module 3, so that the first imaging area and the second imaging area can be separated from each other. In the example shown in FIG. 9, a light entrance 2111 is provided on the light incident surface of the triangular prism 21 to limit the optical beam from the light source 1 to enter the interior of the triangular prism 21 only through the light entrance 2111. A light exit surface of the triangular prism 21 is provided with a first outlet 2121 and a second outlet 2122 for light exiting, and areas other than the first outlet 2121 and the second outlet 2122 are provided with materials that reflect light or absorb light. Optionally, the first outlet 2121 is located on the optical path of the first optical beam which is reflected by the second medium 22, and the second light outlet is located on the optical path of the second optical beam which is reflected by the liquid to be measured.

Figure 13:
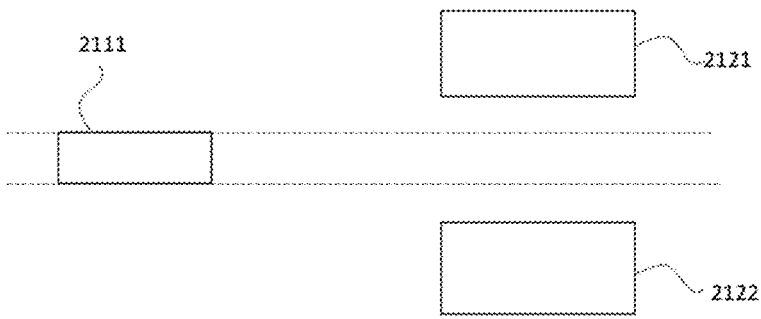
FIG. 13 is an example of a top view of the refractometer shown in FIG. 9.

FIG. 13 is an example of a top view of the refractometer shown in FIG. 9. In this example, the lower edge of the first outlet 2121 is located above the extension line where the upper edge of the light entrance 2111 is located, and the upper edge of the second outlet 2122 is located below the extension line where the lower edge of the light entrance 2111 is located. This can reduce the proportion of the first optical beam exiting from the first outlet 2121, and greatly reduce the proportion of the second optical beam exiting from the second outlet 2122, so that the optical beam exiting from the first outlet 2121 and the optical beam exiting from the second outlet 2122 can be converged by the lens module and respectively incident on two different areas of the array sensor, forming the first imaging area and the second imaging area on the array sensor which are separated.

In some examples, the lower edge of the first outlet and the upper edge of the second outlet may not be subject to this restriction. Even if the second optical beam and the first optical beam emitted from the outlets of the reflecting module cannot be completely separated, the mutual interference between the first imaging area and the second imaging area can still be reduced with the light outlet.

In some examples, the first outlet and the second outlet can be provided by silk screen printing on the light outlet surface of the reflecting module, or by installing structural components on the light outlet surface or one side of the light outlet surface of the reflecting module.

In some examples, due to distribution characteristics of light emitted by the light source, brightness of a central area of the array sensor is different from brightness of a surrounding area. Optionally, different photosensitive units in the array sensor or photosensitive units in different regions is configured with different exposure parameters, such as different exposure intensities, different exposure durations or different exposure times, to improve brightness of a darker areas and ensure a detection image with uniform brightness. This can improve signal-to-noise ratio of detection.

In some examples, the second medium and the detection area may not be arranged side by side on the same surface of the first medium, but arranged in a stacked manner. For example, the second medium is a coating laid on one surface of the first medium, and the detection area is set above the second medium facing away from the first medium.

Both the first optical beam and the second optical beam are sequentially incident on the first medium, the second medium and the detection area. Among them, the first optical beam is totally reflected between the first medium and the second medium so as to form the first stripped area on the detection image, and the second optical beam is totally reflected between the second medium and the liquid to be measured to form the second stripped area on the detection image. The TIR critical angle of the first optical beam (hereinafter referred to as the first TIR critical angle) needs to be greater than the TIR critical angle of the second optical beam (hereinafter referred to as the second TIR critical angle). Therefore, the second medium can be a material with a refractive index greater than a refractive index corresponding to the liquid to be measured.

Optionally, outgoing light of the light source 1 is shaped or the luminance of different light-emitting elements of the light source 1 are adjusted, so that at least 50% of the outgoing light of the light source 1 has incident angle on the second medium 22 less than the first TIR critical angle, which can reduce the brightness dimming of the second stripped area caused by large attenuation of the emitted light of the light source module 1 after passing through the second medium.

Since a refractometer generally requires waterproofing, the second medium can also be made of a material with a waterproof function, so as to seal the first medium in the refractometer. Or, optionally, the side of the second medium facing away from the first medium is also provided with a light-transmitting waterproof material to seal the first medium and the second medium in the refractometer, and the detection area is arranged on a side of the waterproof material facing away from the second medium. Moreover, the waterproof material can be a material with a higher refractive index to widen the gap with refractive index of the liquid to be measured, thereby reducing the ambient light entering the refractometer and reducing the impact of ambient light on the refractive index measurement. Optionally, refraction index of the waterproof material is greater than the maximum refraction index of the refractometer measurement range.

In one example with a waterproof material, an excessive thickness of the waterproof material will affect heat conduction, resulting temperature of liquid to be measured and the second medium cannot be kept basically the same, which will affect self-calibration. But a thin waterproof material has weak hardness. Optionally, thickness of the waterproof material is between 0.05 mm and 3 mm, which can ensure heat conduction and hardness at the same time.

Figure 14:
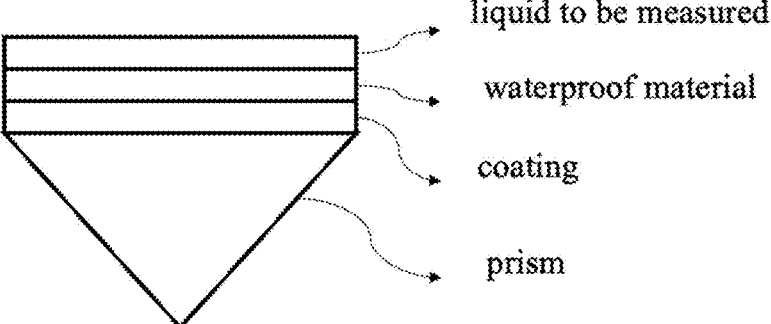
FIG. 14 is a schematic diagram of the positional relationship among the triangular prism, the coating on the surface of the triangular prism, the waterproof material and the liquid to be measured.

Compared with an example where the second medium and the detection area are set at a same layer, stacking the second medium and the detection area can simplify manufacture process, make it easier to achieve waterproofing and reduce cost. The waterproof material can be a glass sheet or other light-transmitting and waterproof material. Refractive index of the waterproof material may be greater than that of the second medium, or smaller than that of the second medium. Take the first medium is a triangular prism and the second medium is a coating on the surface of the triangular prism as an example. In other examples, the first medium and the second medium in this application can be other components, which will be described below. Three examples are explained below with reference to FIGS. 14 to 17 respectively. As shown in FIG. 14, FIG. 14 is a schematic diagram of the positional relationship among the triangular prism, the coating on the surface of the triangular prism, the waterproof material and the liquid to be measured.

Figure 15:
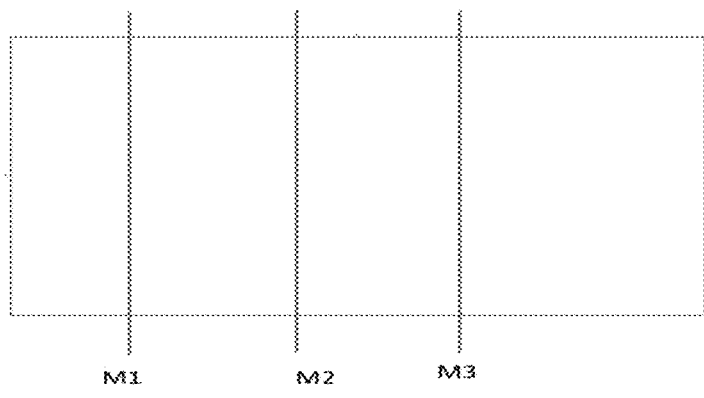
FIG. 15 is an exemplary schematic diagram of a detection image.

Example 1. The first medium is a prism, and the second medium is a coating. Refractive index of the second medium is greater than that of the waterproof material. Since TIR occurs when an optical beam enters an optically sparse medium from an optically dense medium, when an optical beam passes through the first medium, the second medium, the waterproof material, and the liquid in sequence, refractive index of the liquid is less than that of the waterproof material, and the optical beam has a convergence angle that covers all the TIR critical angles between each two adjacent layers, TIR will occur between any two adjacent layers, and then a corresponding stripped area of distinct brightness discontinuity will be formed in the detection image. As shown in FIG. 15, FIG. 15 is a schematic diagram of a detection image. In the detection image, M1 is a stripped area of distinct brightness discontinuity caused by TIR between the first medium and the second medium, which can be used to calculate refractive index of the second medium. M2 is a stripped area of distinct brightness discontinuity caused by TIR between the second medium and the waterproof material, which can be used to calculate refractive index of the waterproof material. M3 is a stripped area of distinct brightness discontinuity caused by TIR between the waterproof material and the liquid, which can be used to calculate refractive index of the liquid. The three stripped areas are arranged sequentially from left to right in the detection image.

Figure 16:
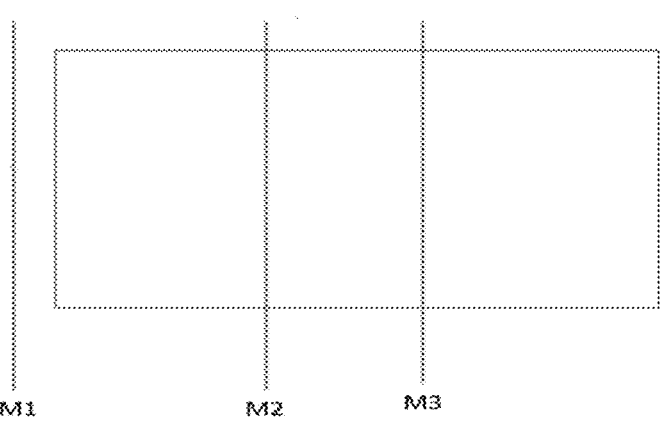
FIG. 16 is another exemplary schematic diagram of a detection image.

Optionally, by setting position of the array sensor 4 relative to the lens module 3, position of the optical beam totally reflected by the first TIR area after being converged by the lens module 3 is located outside the array sensor 4, so that only M2 and M3 can be displayed in the detection image, as shown in FIG. 16. This can further reduce the interference of the first stripped area on the detection of other stripped areas. Moreover, increase of distance between M2 and the right edge of the image can increase measurement range of refractive index of liquid.

Figure 17:
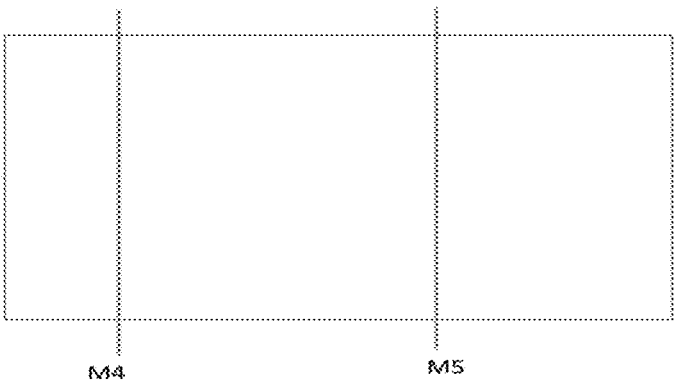
FIG. 17 is another exemplary schematic diagram of the detection image.

Example 2. The first medium is a prism, and the second medium is a coating. Refractive index of the waterproof material is greater than or equal to refraction index of the second medium. When refractive index of the liquid is less than that of the waterproof material, under a condition that the optical beam covers all the TIR critical angles between each two adjacent layers, there will be TIR occur between the first medium and the second medium, as well as between the waterproof material and the liquid. Thus, corresponding stripped areas where distinct brightness discontinuity locates are formed in the detection image. As shown in FIG. 17, FIG. 17 is another schematic diagram of the detection image. In the detection image, M4 is a stripped area of distinct brightness discontinuity caused by TIR between the first medium and the second medium, which can be used to calculate the refractive index of the second medium. M5 is a stripped area of distinct brightness discontinuity caused by TIR between the waterproof material and the liquid, which can be used to calculate refractive index of the liquid.

Compared with Example 1, in Example 2, since one stripped area of distinct brightness discontinuity is reduced in the detection image, interference to the detection of the other two stripped areas can be reduced, and measurement range of the refractometer can be increased.

Example 3. The first medium is a coating on the surface of the triangular prism, the second medium is the waterproof material, and refractive index of the coating is greater than that of the waterproof element. Therefore, the first TIR area relates to TIR of the first optical beam between the coating and the waterproof material, which corresponds to generation of the first stripped area. The second stripped area is generated by TIR of the second optical beam between the waterproof material and the liquid. The processor corrects refractive index of the liquid derived from the second stripped area based on the first stripped area. In this example, the coating is preferably made of a material whose refractive index drifts with temperature in a direction opposite to that of clear water.

In the example where the second medium and the detection area are stacked, since light has undergone TIR between the first medium and the second medium, light of TIR between the second medium and the liquid will attenuate more, which may cause that brightness of the second stripped area is lower than that of the first stripped area, resulting in a lower signal-to-noise ratio.

In one example, the array sensor is configured to continuously generate a detection image sequence including multiple frames of detection images, wherein different exposure parameters are used for two adjacent frames of the detection image sequence. The exposure parameters may include at least one of exposure intensity, exposure duration or exposure times. The processor is configured to combine at least two adjacent frames into one frame of images for detection, so as to increase brightness of the second stripped area and improve the signal-to-noise ratio.

In one example, the array sensor is configured to continuously generate a sequence of detection images, wherein luminous intensity of the light source is different during two periods in which two adjacent detection images are respectively generated by the array sensor. In this way, by increasing luminous intensity of the light source corresponding to one of the detection images, intensity of the optical beam totally reflected between the second medium and the liquid can be increased, thereby increasing brightness of the second stripped area, while avoiding saturation of the first stripped area in brightness and avoiding an increase in the signal-to-noise ratio.

In each of the above examples, refractive index of the liquid is calculated by identifying the second stripped area on the detection image caused by TIR of the liquid, and the second medium is set to form a first stripped area on the detection image for self-calibration. Optionally, the refractometer may be further provided with at least one additional medium to induce TIR of the optical beam to form an additional at least one stripped area of distinct brightness discontinuity in the detection image for calibrating the refractive index of the liquid. For example, in the embodiment shown in FIG. 9, at least a third medium is arranged on the surface of the first medium side by side with the second medium and a detection area. The third medium is used to receive and totally reflect a third optical beam from the light source, forming a new stripped area of distinct brightness discontinuity in the detection image. In another example, there is at least a third medium stacked with the first medium, the second medium and the detection area, and the third medium is configured to trigger TIR of light when the light is incident on the third medium or when it is incident from the third medium, forming a new stripped area of distinct brightness discontinuity in the detection image.

When calibrating refractive index of the liquid, the stronger the correlation between characteristics of refractive index varying with temperature of the medium used for calibration and that of the liquid, the more accurately the refractive index of the liquid is calibrated. By setting two or more media for calibrating refractive index of the liquid, choosing a stripped area of distinct brightness discontinuity corresponding to a medium that has stronger correlation with the liquid to be measured for calibration, can improve accuracy of calibration of refractive index of the liquid. In an example where two or more media are set for calibration of refractive index of the liquid, when choosing a stripped area from two or more stripped areas corresponding to the two or more media, the one that is closest to the stripped area corresponding to the liquid can be chosen, or a new stripped area is generated based on the two or more stripped areas. In some example, a machine learning method may be used to select or generate the stripped area for calibration.

There are a number of ways for the processor to identify the positions of tripped areas where distinct brightness discontinuity locates in the detection image. For example, the processor may calculate brightness gradient change of each pixel row in the reflection area in the detection image, and determine one or more pixels with the largest gradient change in each pixel row as the pixels in the tripped areas. Alternatively, the processor may also acquire the positions through methods such as edge detection, template matching, or machine learning. Optionally, in the process of identifying positions of the tripped areas, the processor may also obtain current temperature and/or boundary deviation caused by assembly tolerance, and compensate positions of the tripped areas according to the current temperature and/or the boundary deviation position. After identifying a position of a tripped area, the processor can look up a corresponding refractive index in a preset relationship table between a position of a tripped area and refractive index.

The processor identifies the first tripped area and the second stripped area in the detection image, and calculates refractive index of the liquid according to the position of the second tripped area, and calibrate refractive index of the liquid based on the position of the first tripped area. There are many ways to calibrate refractive index of the liquid according to the position of the first tripped area. For example, a relationship between distance between the first tripped area and the second tripped area and position compensation is stored in the refractometer. The processor is configured to determine a position compensation based on the relationship and the distance of the identified first tripped area and the identified second stripped area, and calculate a position of the second stripped area at a certain fixed temperature, such as 20° C. based on the identified second stripped area and the position compensation. Alternatively, other methods, such as a machine learning method, can be used to calibrate refractive index of the liquid according to the position of the first tripped area.

In one example, the array sensor can be a complementary metal oxide semiconductor (Complementary Metal Oxide Semiconductor, CMOS) sensor array. Or the array sensor can also be other photoelectric sensors such as CCD image sensors. Optionally, after the detection image is generated, the processor obtains brightness of the detection image, and derive refractive index of the detection image only after brightness of the detection image satisfies a preset condition. In one example, the preset condition comprises that absolute value of the difference between the detected image brightness and the preset target brightness is greater than a threshold.

Compared with use of a linear array as image sensor in the prior art, use of array sensor as image sensor, such as CMOS array sensor, can not only has less installation requirements, but also can obtain information that the linear array could not obtain. For example, before calculating refractive index of the liquid based on a detection image generated by the array sensor, the processor can perform noise filtering according to multiple rows of pixel values in the detection image to improve signal-to-noise ratio. The processor may perform noise filtering in a space domain or in a transformation domain. In one example, the processor can perform noise filtering based on average filtering with filtering window sliding. The width of the filtering window can be a value between 1 and the width of the detection image, and the height can be a value between 1 and the height of the detection image. In one example, the processor may perform weighting processing, such as example, averaging processing, on multiple rows of pixel values to obtain a noise-filtered result, and then calculate the refractive index of the liquid according to the noise-filtered result. In other examples, the processor may use other noise filtering methods, such as a machine learning method to filter noise of the detection image.

Figure 18:
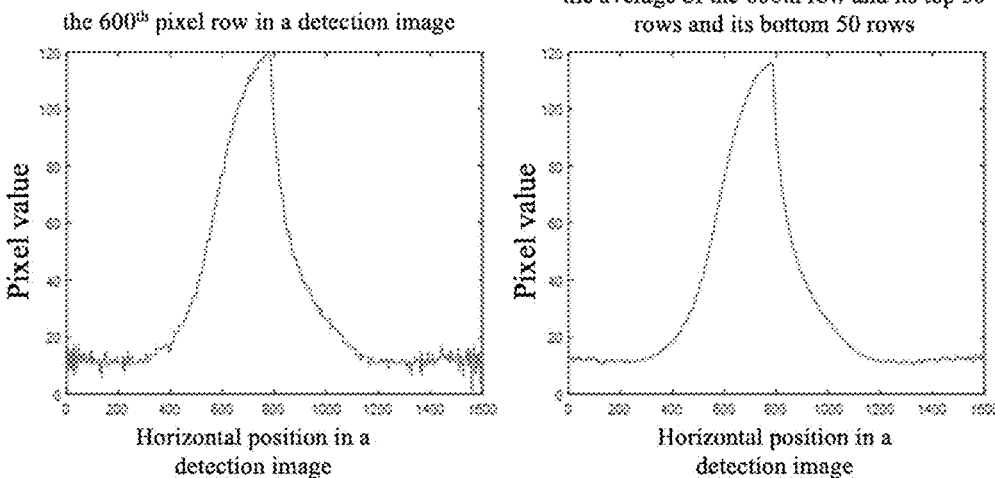
FIG. 18 shows a pixel value curve of a pixel row on a detection image generated by the array sensor in one example in the left side, and shows an average of pixel values of the pixel row and pixel values of one or more upper rows and one or more lower rows in the right.

As shown in FIG. 18, FIG. 18 shows a pixel value curve of a pixel row on a detection image generated by the array sensor in one example in the left side, and shows an average of pixel values of the pixel row and pixel values of one or more upper rows and one or more lower rows in the right. From the average of pixel values, it can be seen that influence of noise can be reduced after averaging processing with pixel values of the multiple rows. Compared with only one column of pixel values in the prior art (that is, only pixel values of the linear array sensor), use of an array sensor in this disclosure can increase the accuracy of measurement.

For another example, when calculating refractive index of the liquid based on multiple rows of pixel values in the reflection area in the detection image, the processor can eliminate one or more rows of pixel values affected by stray light, or reduce influence weights of the pixel values in one or more rows of pixel values affected by stray light.

A row of pixel values less affected by stray light can be selected from a detection image to calculate refractive index of liquid. Stray light is interference light formed in the optical system due to surface wear, dirt, fog condensation or device position deviation. The presence of stray light will reduce calculation accuracy of the refractive index. With the array sensor, the processor can determine a pixel row affected by stray light by comparing and analyzing brightness of multiple rows of pixel values. Compared with the linear array sensor in the prior art, the two-dimensional array sensor in this disclosure can improve accuracy of refractive index measurement. Optionally, the processor can also determine the pixel rows affected by stray light by comparing and analyzing multiple frames of detection images. This is more robust for refractive index measurements in the presence of stray light.

In one example, before calculating the refractive index, the processor may perform noise filtering according to multiple frames of detection images. For example, after the array sensor generate multiple frames of initial images, the processor can perform weighted sum processing on the multiple frames of initial images to synthesize a frame of detection image, and then use the detection image to calculate the refractive index. Optionally, before calculating the refractive index, the processor may also use the noise filtering method described above to perform further noise filtering on the synthesized detection image.

In one example, the control module obtains brightness information of the current environment, and adjust the detection image quality of the array sensor according to the brightness information, so as to obtain a better measurement quality. The control module further adjusts at least one of the following items according to the brightness information: output light intensity of the light source, exposure time of the array sensor, analog gain of the array sensor, or digital gain of the array sensor. The array sensor can be used to measure the ambient light in a time period other than measuring light from the light source. Or the refractometer is also provided with other sensors for measuring brightness information of the current environment.

In one example, a first temperature sensor and a second temperature sensor are arranged in the refractometer. The first temperature sensor is configured to measure temperature of the second medium. The second temperature sensor is arranged on the detection area to measure temperature of the liquid. Alternatively, the first temperature sensor and the second temperature sensor may not be in direct contact with the second medium or the liquid to be measured, but may be in contact with a material with better thermal conductivity as a medium. Optionally, the first temperature sensor may be installed on the surface of the prism, and the processor is further configured to calculate temperature of the second medium according to the temperature of the surface of the prism measured by the first temperature sensor. In the actual process, it is more difficult to fix the first temperature sensor on the surface of the second medium. The difficulty of the process can be reduced by installing it on the surface of the prism, and then calculate the temperature of the second medium through the temperature measured on the surface of the prism and a preset model.

The processor is configured to obtain measurement results of the first temperature sensor and the second temperature sensor, so as to further calibrate the refractive index of the liquid. Since the refractive index of the liquid is related to the temperature of the liquid, and the temperature of the prism determines the ratio of thermal expansion and contraction of the prism thus causing a deviation of the incident and outgoing angles of the optical beams. Therefore, through a pre-established relationship model between temperature of the liquid, temperature of the reflecting module and the refractive index of the liquid to be measured, refractive index of the liquid is derived according to the obtained temperature of the liquid, the obtained temperature of the reflecting module and the relationship model, which can improve the accuracy of the derived refractive index.

For example, in an application scenario where the temperature difference between the second medium of the refractometer and the liquid to be measured is small, the temperature deviation can be calculated through the first temperature sensor and the second temperature sensor. The temperature deviation is used when calibrating the position of the second stripped area based on the position of the first stripped area, which can improve accuracy of the calibration. In an application scenario where the temperature difference between the second medium and the liquid is relatively large, such as an application scenario where measuring a high-temperature liquid to be measured at room temperature), due to slow temperature conduction caused by the large temperature difference when measuring the liquid, the two temperature sensors helps to obtain two accurate temperatures which can be used to predict a temperature of the second medium and the liquid reaching thermal equilibrium. In one example, temperature change trends of the second medium and the liquid respectively obtained based on the measurement of the two temperature sensors, are used to predict temperature changes of the second medium and the liquid more accurately wiht a preset temperature change model. The predicted temperature changes are used to calibrate the refractive index measurement of the liquid.

In one example, the processor is configured to calculate the turbidity of the liquid according to the detection image generated by the array sensor. Among the outgoing light from the light source, an optical beam transmitted from the reflecting module to the liquid will be scattered when encountering suspended particles in the liquid, and part of the scattered light will be transmitted through the reflecting module and then incident on the array sensor. Scattering includes Rayleigh scattering, Mie scattering and refraction caused by different size of scattering particles and different scattering angles. By analyzing a detection image generated by the array sensor, the processor can obtain light intensity distribution of the detection image, and obtain a size and properties of the scattering particles according to the light intensity distribution, which is used to determine turbidity of the liquid.

For example, as shown in FIG. 8, scattering caused by particles in the liquid can cause luminance of non-reflective area to be greater than expected. Thus, the processor calculates particle concentration of the liquid based on brightness of the non-reflection area. Specifically, since different pixels in the detection image correspond to optical beams incident at different angles on the total reflection interface, it can be understood that the non-reflection area in the detection image includes a TIR area and a non-TIR area. In FIG. 8, the TIR area of the non-reflection area is located on the upper and lower sides of the TIR area of the reflection area, and the non-TIR area of the non-reflection area is located on the upper and lower sides of the non-TIR of the reflection area. Since light scattered by the particles in the liquid can only re-enter the reflecting module at an angle within the TIR critical angle, only the area corresponding to incident angle less than the TIR critical angle will appear in the detection image generated by the array sensor. That is, the scattered light will only appear in the non-TIR area in the detection image.

Therefore, in one example, the processor calculates the scattered brightness according to brightness of the non-TIR area in the non-reflection area on the detection image. Optionally, the processor uses brightness of the TIR area in the non-reflection area as a reference value to calculate the absolute value of the scattering brightness. For example, the processor may subtract brightness of the TIR area in the non-reflection area from brightness of the non-TIR area in the non-reflection area on the detection image to obtain scattering brightness. After obtaining the scattering brightness, the processor obtain a corresponding turbidity of the liquid according to a pre-established relationship model between scattering brightness and liquid turbidity.

Optionally, when the processor obtains the brightness of the TIR area in the non-reflection area, it performs weighted average processing on brightness of at least some pixels in the area to obtain brightness of the TIR area. Similarly, when determining brightness of the non-TIR area in the non-reflection area, weighted average processing is performed on brightness of at least some pixels in the area to obtain brightness of the TIR area. This can reduce calculation errors.

For another example, as shown in FIG. 8, scattering caused by particles close to the TIR interface of the reflecting module will cause the stripped areas in the reflection area in the detection image to be blurred, so the processor can obtain blurriness of the stripped areas on the detection image and determine turbidity of the liquid according to the blurriness. In one example, the processor looks up a preset table comprising relationship between blurriness and turbidity to obtain the corresponding turbidity of the liquid based on the blurriness.

In some examples, the processor is used to calculate turbidity of the liquid according to the brightness on the non-reflection area in the detection image when the concentration of the liquid is lower than a preset concentration, and calculate turbidity of the liquid according to the blurriness when the concentration of the liquid is higher than the preset concentration. When the concentration of the liquid is low, turbidity of the liquid has a good linear relationship with brightness of the non-reflection area in the detection image, and the calculation of turbidity according to the brightness of the non-reflection area can have higher accuracy. When the concentration of the liquid is high, the linear relationship is weakened, and it is more accurate to calculate the turbidity through the blurriness of the stripped areas.

There are many applications scenario for using a refractometer to measure turbidity. In some examples, refractometers can be used to perform compositional testing of liquids. For example, a refractometer can simultaneously measure the refractive index and turbidity of liquid to determine its properties. For another example, a refractometer can measure the refractive index and turbidity of liquid, such as coffee, and determine sugar content and milk content of the liquid. As another example, a refractometer can simultaneously measure the refractive index and turbidity of liquid, such as fruit juice, to determine sugar content and pulp content of the liquid. As another example, a refractometer can measure the refractive index and turbidity of liquid in a sensor, which can be used to determine whether the sensor is dirty. Optionally, the dirty detection result can be used to decide whether to continue cleaning. In one application scenario, the refractometer can be used for cleaning machines, such as dishwashers or washing machines, and detect the refractive index and turbidity of the liquid after cleaning an object to determine the cleanliness of the cleaned object. In one application scenario, refractometers can be used for water quality detection. The detection result of the refractometer can be displayed to users through an interactive module.

Since change of the turbidity of the liquid will also affect the refractive index of the liquid, in some examples, the processor is further configured to calibrate the refractive index of the liquid based on a preset relationship between turbidity and refractive index after obtaining the turbidity of the liquid. For example, in an application scenario, when a refractometer is to measure turbidity and sugar content of a liquid, the ratio of milk and sugar in the liquid can be distinguished by measuring the turbidity and sugar content of the liquid simultaneously to obtain accurate milk volume and brix values, which can then help to more accurately calculate calorie content of the liquid.

In one example, the refractometer also has a standby mode and/or a low power mode. In this standby mode, the control module is in a sleep standby state, the light source and the array sensor are both powered off, and the overall power consumption of the refractometer is at an uW level. In the low power consumption mode, the control module is configured to control the light source and the array sensor to strobe synchronously with the power-on time being short, and the overall power consumption of the refractometer is at a mW level. Specifically, when the control module controls the light source and the array sensor, it can synchronously trigger a pulse width modulation (PWM) signal according to the frame signal of the array sensor to realize dimming of the light source.

In some examples, the refractometer further includes at least one of the following: a colorimeter for detecting color of the liquid, an impedance meter for detecting content of ions, such as acid ions, in the liquid, and a PH value meter for measuring acidity value of the liquid. The processor can determine type of the liquid based on this information.

In one example, the refractometer includes a wireless communication module, which is configured to send at least one of the refractive index, turbidity, and temperature of the liquid obtained by the processor to other terminals, such as small programs in mobile phones, applications, computers or servers. The terminals can display or analyze the collected data from one or more refractometers. In one example, the refractometer further includes an interactive module for displaying the detected data to the user.

The present application also provides a detecting device, which is provided with the above-mentioned refractometer. For example, the detecting device is a smart cup. FIG. 19 is a schematic structural diagram of a smart cup. As shown in FIG. 19, the smart cup includes a cup body and the above-mentioned refractometer 201 arranged in the cup body for detecting the refractive index and/or turbidity of the liquid in the water cup. The refractometer 201 is arranged at the bottom of the cup body 200. Or, optionally, the refractometer is fixed at the cup lid in the cup body, which can be installed conveniently. When it is necessary to measure the refractive index of a liquid, the user only needs to invert the water cup covered with the lid to realize the measurement immediately. The refractometer can be an independent module fixed in the cup body of the smart cup. In this way, the refractometer and the cup body of the smart cup can be assembled independently, and the structure and waterproof process are simpler. Or, the refractometer can be integrated in the cup body of the smart cup. Optionally, in the above example in which the refractometer includes waterproof materials, the refractometer may be embedded inside the glass cup, and the cup wall is used as the waterproof material of the refractometer.

Optionally, the smart cup is also provided with a micro-pressure sensor and a computing module. The micro-pressure sensor is configured to detect the volume of the liquid in the water cup, and the calculation module is used to calculate the calorie of the liquid in the water cup according to the refractive index and/or turbidity of the liquid measured by the refractometer. Optionally, the micro-air pressure sensor is arranged in a closed space formed between the bottom of the cup body and the diaphragm arranged on the bottom.

For another example, the detecting device is an intelligent scale. FIG. 20 is a structural schematic diagram of a smart scale. As shown in FIG. 20, the smart scale includes a scale body 210 and the above-mentioned refractometer 211 arranged in the scale body 210, the surface of the scale body 210 is also provided with a liquid accommodating area 212 and a first display area which is not shown in the figure. The refractometer 211 is used to detect refractive index of the liquid in the liquid accommodating area 212, and the first display area is used to display refractive index of the liquid. Optionally, the surface of the smart scale is also provided with a weighing area 213 and a second display area which is not shown in the figure, and the second display area is configured to display the weight of the object on the weighing area. Optionally, the weighing area 213 and the liquid containing area 212 are arranged side by side on the surface of the smart scale. Optionally, the first display area and the second display area are set separately or combined.

For another example, the detecting device is an intelligent animal urine detector, such as a mat. The intelligent animal urine detector is equipped with the above-mentioned refractometer, and measures the refractive index of animal urine by the refractometer.

The present disclosure also provides a method for detecting refractive index of liquid by using a refractometer. FIG. 21 is a schematic diagram of an embodiment of a method for detecting refractive index of liquid by using a refractometer in the present disclosure. As shown in FIG. 21, The method includes the following steps: S2101, emitting, by a light source, optical beams to a reflecting module in a refractometer. S2102, converging, by a lens module, optical beams totally reflected by a reflecting module to an array sensor located on the focal plane of the lens module. S2103, generating, by the array sensor, a detection image from received light. S2104, identifying, by a processor, a stripped area where distinct brightness discontinuity locates in the detection image and is formed due to TIR of light. S2105, deriving, by the processor, a corresponding TIR critical angle according to the position of the stripped area in the detection image. S2106, deriving, by the processor, a refractive index of the liquid based on the TIR critical angle.

In one example, the refractometer further includes a detection area arranged on a surface of a medium in the reflecting module. When the detection area is covered with liquid to be measured, and refractive index of the liquid is lower than that of the medium next to the liquid, at least part of the optical beam is totally reflected by the liquid.

In one example, the optical beams include a first optical beam and a second optical beam, and the reflecting module includes a first medium and a second medium adjacently arranged, and the refractive index of the first medium is greater than that of the second medium. The first optical beam is incident from the first medium to the second medium, and is at least partially totally reflected by the second medium. The refractometer includes a detection area arranged on one of the media in the reflecting module, which is configured to receive the second optical beam. When the detection area is covered with liquid, and the refractive index of the liquid is lower than that of the medium next to the liquid, at least part of the second beam is totally reflected by the liquid. A first stripped area where distinct brightness discontinuity caused by TIR of the first optical beam by the second medium is formed in the detection image and a second stripped area where distinct brightness discontinuity caused by TIR of the second optical beam by the liquid is formed in the detection image. The method further includes: deriving refractive index of the liquid according to the position of the second stripped area, and calibrating the refractive index of the liquid according to the position of the first stripped area.

In one example, the detection area and the second medium are respectively located in different areas on a same surface of the first medium, and the second optical beam is incident from the first medium without passing through the second medium to the detection area.

In one example, the reflecting module further comprises a third medium having a different refractive index from the second medium. The third medium, the detection area and the second medium are respectively located on different regions of a same surface of the first medium area. The optical beams further comprise a third optical beam. The third optical beam is at least partially totally reflected when it is incident from the first medium to the third medium, and a third stripped area where distinct brightness discontinuity caused by TIR of the third optical beam by the third medium is formed in the detection image. The calibrating the refractive index of the liquid according to the position of the first stripped area, comprises that calibrating the refractive index of the liquid according to the position of the first stripped area and/or the position of the third stripped area.

In one example, the first medium comprises a prism having a light incident surface, a light exit surface, and a detection surface, and the detection area and the second medium are respectively located on different regions of the detection surface. The method further comprises: allowing, through the first outlet on the light exit surface, at least part of the optical beam totally reflected by the second medium to enter the lens module, and allowing, through the second outlet on the light exit surface, at least part of the optical beam totally reflected by the liquid to enter the lens module. In one example, a light inlet is further provided on the light incident surface, and the first optical beam and the second optical beam are incident on the detection surface through the light inlet; wherein, the first outlet and the second outlet are respectively located on two sides of the projection of the light inlet on the light exit surface, without overlapping with the projection.

In one example, the first medium, the second medium, and the detection area are stacked, and the detection area is set on the side of the second medium facing away from the first medium, and the second optical beam is sequentially through the first medium and the second medium.

In one example, the reflecting module includes a prism having a light incident surface, a light exit surface and a detection surface, and the detection area is located on the detection surface. A cured material layer and a transparent glass layer are sandwiched between the detection area and the detection surface. The transparent glass layer is configured to seal the material layer and the prism in the refractometer, and the detection area is located on a side of transparent glass layer facing away from the material layer.

In one example, the refractive index of the prism is greater than the refractive index of the material layer, and the refractive index of the material layer is greater than the refractive index of the transparent glass layer. When the refractive index of the liquid is less than that of the transparent glass layer, at least three stripped areas of distinct brightness discontinuity are formed on the detection image; wherein the first medium is the prism, and the second medium is the material layer; or, the first medium is the material layer, and the second medium is the transparent glass layer.

In one example, the refractive index of the prism is greater than that of the material layer, the refractive index of the material layer is greater than that of the transparent glass layer, and the position of array sensor avoids the position where the totally reflected optical beam by the material layer is converged by the lens module, resulting only two stripped areas of distinct brightness discontinuity formed on the detection image; wherein the first medium is the prism and the second medium is the cured material layer, or the first medium is the cured material layer and the second medium is the transparent glass layer.

In one example, the refractive index of the prism is greater than that of the material layer, the refractive index of the material layer is less than or equal to the refractive index of the transparent glass layer, the first medium is the prism, and the second medium is the material layer. Or the refractive index of the prism is less than or equal to the refractive index of the material layer, and the refractive index of the material layer is greater than that of the transparent glass layer.

In one example, the cured material layer is a photocured coating, or a high temperature cured coating, or a naturally cured coating. In one example, the cured material layer is a photocured UV glue. In one example, the cured material layer has a refractive index greater than 1.33 and not greater than 1.6, and the value of the refractive index varying with temperature is within −0.0003/deg C. to 0.0003/deg C. In one example, the refractive index of the second medium is greater than 1.33 and not greater than 1.6, and the change of the refractive index with temperature change of per degree Celsius is within −0.0003 to 0.0003.

In one example, at least one detection image has pixels applied with different exposure parameters, or at least one detection image is applied with an exposure parameter different from that of another image. Or, optical beams from the light source have different luminous intensities for at least two detection images respectively.

In one example, an aperture of a light-emitting surface of the light source and an aperture of the lens module are the same or have a difference less than ⅕ of the aperture of the lens module, or an aperture of a light-emitting surface of the light source is greater than twice of an aperture of the lens module. In one example, the detection angle range of the array sensor covers TIR critical angle range of the reflecting module. In one example, half width at half height of the optical beams from the light source is less than 5 nm, and an optical path of the optical beams is equipped with a narrowband filter, and half width at half height of optical beams filtered by the narrowband filter is less than 5 nm. In one example, a light diffusing sheet is arranged on the outgoing light path of the light source. In one example, the emitted light of the light source is green light, and the array sensor is a CMOS sensor with a Bayer pattern of RGGB.

In one example, the processor identifies the first stripped area and the second stripped area in the detection image at least when the processor determines that difference between brightness of the detection image and a preset brightness is less than a threshold. In one example, the processor filters a target pixel row based on at least a portion of an upper pixel row and at least a portion of a lower pixel row of the target pixel row in the detection image before identifying the first stripped area and the second stripped area. In one example, a filtered pixel in the target pixel row is determined based on a weighted average of at least a pixel in the target pixel row, a pixel in the upper pixel row and a pixel in the lower pixel row. In one example, the processor is configured to identify pixels affected by stray light in the detection image, and exclude the identified affected pixels in deriving the refractive index of the liquid, and the pixels affected by stray light is identified by comparing brightness between multiple pixel rows and/or comparing brightness between multiple detection images. In one example, the array sensor generates one or more initial detection images by detecting received optical beam, and the detection image is obtained based on weighted summation of multiple initial detection images.

In one example, the method further comprises obtaining temperature of a medium located outside the detection surface and temperature of the detection surface, and deriving refractive index of the liquid based on a pre-stored relationship model among temperature of the liquid, temperature of the detection surface and refractive index of liquid, obtained temperature of the medium outside the detection surface and obtained temperature of the detection surface.

In one example, the method further comprises deriving turbidity of the liquid. In one example, the detection image includes a non-reflection area. Deriving turbidity of the liquid comprises that acquiring scattering brightness of the non-TIR area in the non-reflection area, and/or blurriness of the stripped area of distinct brightness discontinuity, and deriving turbidity of the liquid based on the scattering brightness and/or the blurriness of the stripped area; wherein, the non-TIR area in the non-reflection area corresponds to the area in the non-reflection area where light reflected by the reflecting module at an angle less than the TIR critical angle is incident on the array sensor.

In one example, the non-reflection area further comprises a TIR area located on one side of the non-TIR area; the acquisition of the scattered brightness of the non-TIR area in the non-reflection area is calculated with brightness of the TIR area in the non-reflection area as a reference value. In one example, derivation of the turbidity comprises that deriving the turbidity of the liquid according to the scattering brightness of the non-TIR area in the non-reflection area when the concentration of the liquid is lower than a preset concentration, and that deriving the turbidity of the liquid according to blurriness of the stripped area when concentration of the liquid is greater than the preset concentration.

In one example, the medium located outside the reflecting module is the liquid to be measured; and the method further comprises obtaining the volume of the liquid, and calculating the calories of the liquid based on the volume, the refractive index, the turbidity of the liquid. In one example, the medium located outside the reflecting module is the liquid; the method further comprises using auxiliary equipment to obtain auxiliary information, and determining type of the liquid according to the auxiliary information and the refractive index and/or turbidity of the liquid; wherein the auxiliary equipment includes a colorimeter, and the auxiliary information includes color of the liquid; or, the auxiliary equipment includes an impedance meter, and the auxiliary information includes the ion content of the liquid; or, the auxiliary equipment includes a pH meter, and the auxiliary information includes acidity value of the liquid.

In one example, before emitting optical beams to the reflecting module in the refractometer, the method further comprises: emitting liquid to clean a target object, and the medium outside the reflecting module is the liquid after cleaning the target object. The method further comprises that determining cleanliness of the target object according to the refractive index of the liquid after cleaning the target object. In one example, the method further comprises that determining whether to continue cleaning the target object according to the cleanliness of the target object.

In one example, before emitting optical beams to the reflecting module in the refractometer, the method further comprises: fixing the refractometer on the inner wall of the pipeline; wherein the refractometer is configured to measure the refractive index of the flowing liquid in the pipeline, the stripped areas comprise a stripped area of distinct brightness discontinuity caused by TIR of the flowing liquid in the pipeline. Since the refractometer of the present disclosure can be self-calibrated in real time, compared with the existing refractometer that needs to be calibrated before measuring the liquid, the refractometer of the present disclosure can obtain more accurate measurement results when measuring the flowing liquid in the pipeline.

Although the present disclosure has been particularly shown and described in conjunction with preferred embodiments, it will be understood by those skilled in the art that changes in form and details may be made to the present disclosure without departing from the spirit and scope of the disclosure as defined by the appended claims. Making various changes is within the protection scope of the present disclosure.

What is claimed is:

1. A refractometer, comprising:

one or more processors;

an array sensor;

a light source configured to emit a light beam;

a reflecting module configured to reflect a portion of the light beam from the light source, the reflecting module comprising a prism having a first surface and at least one medium disposed on the first surface, wherein a detection area configured to hold a liquid to be detected is disposed on the first surface or on one of the at least one medium; and a lens module configured to converge the reflected light beam from the reflecting module onto the array sensor, wherein the array sensor is located on the focal plane of the lens module and is configured to detect the received light beam and generate a detection image;

wherein a portion of light incident on a first interface which locates between two adjacent media is totally internally reflected toward the lens module, and is then converged onto the array sensor, thereby forming a first strip-shaped area with a distinct brightness discontinuity in the detection image for self-calibration; wherein the two adjacent media are two media among the prism and the at least one medium;

wherein when a refractive index of the liquid to be detected is less than that of the medium adjacent to the liquid, a portion of light incident on a second interface which locates between the liquid to be detected and the medium adjacent to the liquid is totally internally reflected toward the lens module, and is then converged onto the array sensor, thereby forming a second strip-shaped area with a distinct brightness discontinuity in the detection image; and wherein the one or more processors are configured to identify the first strip-shaped area and the second strip-shaped area and derive the refractive index of the liquid to be detected based on the positions of the first strip-shaped area and the second strip-shaped area.

2. The refractometer of claim 1, wherein the detection area and the medium with a smaller refractive index among the two adjacent media are separately arranged on the first surface-or on one of the at least one medium, or wherein the detection area and the medium with a smaller refractive index among the two adjacent media are stacked on the first surface or on one of the at least one medium, with said medium disposed therebetween; and the second portion of the light beam passes through the prism and said medium before being incident on the liquid to be detected.

3. The refractometer of claim 2, wherein the at least one medium comprises a cured material layer and a transparent glass layer disposed between the detection area and the first surface;

wherein the transparent glass layer is configured to seal the cured material layer and the prism within the refractometer, and the detection area is located on a side of the transparent glass layer facing away from the cured material layer, and wherein the-two adjacent media among the prism and the at least one medium are the cured material layer and the prism, or the transparent glass layer and the cured material layer.

4. The refractometer of claim 3, wherein a refractive index of the prism is greater than that of the cured material layer, and a refractive index of the cured material layer is greater than that of the transparent glass layer, and wherein a position of the array sensor is configured to avoid a position where a light beam totally reflected by the transparent glass layer is converged by the lens module, thereby preventing a third strip-shaped area with distinct brightness discontinuity from appearing in the detection image.

5. The refractometer of claim 3, wherein the cured material layer is cured UV adhesive.

6. The refractometer of claim 2, wherein the prism further has a light incident surface and a light exit surface, wherein the light incident surface is provided with an inlet for allowing entrance of the light beam, wherein the light exit surface is provided with an outlet for allowing exit of the reflected-light beam, or is provided with a first outlet for allowing exit of the reflected first portion of the light beam by the second medium and a second outlet for allowing exit of the reflected second portion of the light beam.

7. The refractometer of claim 1, wherein the detection image comprises a first edge and a second edge opposite to the first edge, and the first edge corresponds to a higher refractive index than the second edge, and wherein the first strip-shaped area is located in the detection image between the first edge and a strip-shaped area corresponding to a maximum refractive index within a measurement range of the refractometer.

8. The refractometer of claim 1, wherein the array sensor is configured to generate one or more detection images, wherein at least one detection image has pixels with different exposure parameters, or at least one detection image is applied with an exposure parameter different from that of another detection image, or wherein light beams from the light source have different luminous intensities for at least two detection images, respectively.

9. The refractometer of claim 1, wherein an aperture of a light-emitting surface of the light source and an aperture of the lens module are the same, or have a difference less than 1/5 of the aperture of the lens module, or wherein an aperture of a light-emitting surface of the light source is greater than twice the aperture of the lens module.

10. The refractometer of claim 1, wherein a full width at half maximum of the light beam from the light source is less than 5 nm, or wherein an optical path of the light beam is equipped with a narrowband filter, and a full width at half maximum of light beam filtered by the narrowband filter is less than 5 nm.

11. The refractometer of claim 1, wherein the one or more processors are configured to perform noise filtering on a target pixel row in the detection image based on at least a portion of an upper pixel row and at least a portion of a lower pixel row of the target pixel row before identifying the first strip-shaped area and the second strip-shaped area.

12. The refractometer of claim 11, wherein a filtered pixel in the target pixel row is obtained through noise filtering based on a weighted average of at least one pixel in the target pixel row, at least one pixel in the upper pixel row and at least one pixel in the lower pixel row.

13. The refractometer of claim 12, wherein the one or more processors are configured to identify pixels affected by stray light in the detection image, and exclude the identified affected pixels when deriving the refractive index of the liquid to be detected, and wherein the pixels affected by stray light are identified by comparing brightness between multiple pixel rows and/or comparing brightness between multiple detection images.

14. The refractometer of claim 1, wherein the array sensor is configured to generate one or more initial detection images by detecting the received light beam, and the detection image is obtained based on a weighted summation of two or more of the initial detection images.

15. The refractometer of claim 1, wherein the one or more processors are configured to obtain the blurriness of the first strip-shaped area and the second strip-shaped area, respectively, and derive the turbidity of the liquid to be detected based on the blurriness of the first strip-shaped area and the second strip-shaped area.

16. The refractometer of claim 1, further comprising a first temperature sensor and a second temperature sensor;

wherein the first temperature sensor is in contact with the medium with a smaller refractive index among the two adjacent media to detect a temperature of said medium; and wherein the second temperature sensor is disposed on the detection area to measure a temperature of the liquid to be detected.

17. The refractometer of claim 16, wherein a relationship model among the temperature of liquid to be detected, the temperature of the medium with a smaller refractive index among the two adjacent media and the refractive index of liquid to be detected is stored in the refractometer; and wherein the one or more processors are configured to derive the refractive index of the liquid to be detected based on the temperatures obtained by the first temperature sensor, the temperatures obtained by the second temperature sensor, and the relationship model.

18. The refractometer of claim 1, wherein at least one of the following is adjusted to adjust the quality of the detection image: the light intensity of the light source, the exposure time of the array sensor, the analog gain of the array sensor, or the digital gain of the array sensor.

19. The refractometer of claim 1, wherein the refractive index of the medium with a smaller refractive index among the two adjacent media is greater than 1.33 and not greater than 1.6, and has a variation of no greater than 0.0003 per degree Celsius of temperature change.

20. A method for measuring a refractive index, comprising:

emitting, by a light source, a light beam to a reflecting module;

reflecting, by the reflecting module, a portion of the light beam from the light source to a lens module, the reflecting module including a prism having a first surface and at least one medium disposed on the first surface, wherein a detection area is disposed on the first surface or on one of the at least one medium, the detection area being configured to hold a liquid to be detected;

converging, by the lens module, the reflected light beam by the reflecting module onto an array sensor located on the focal plane of the lens module, generating, by the array sensor, a detection image from the received light beam;

wherein a portion of light incident on a first interface which locates between two adjacent media is totally internally reflected toward the lens module, and is then converged onto the array sensor, thereby forming a first strip-shaped area with a distinct brightness discontinuity in the detection image for self-calibration; wherein the two adjacent media are two media among the prism and the at least one medium;

wherein when a refractive index of the liquid to be detected is less than that of the medium adjacent to the liquid, a portion of light incident on a second interface which locates between the liquid to be detected and the medium adjacent to the liquid is totally internally reflected toward the lens module, and is then converged onto the array sensor, thereby forming a second strip-shaped area with a distinct brightness discontinuity in the detection image; and further comprising:

identifying, by one or more processors, the first strip-shaped area and the second strip-shaped area in the detection image, deriving, by the one or more processors, the refractive index of the liquid to be detected based on the positions of the first strip-shaped area and the second strip-shaped area.

* * * * *